(12) United States Patent
Weidemaier et al.

(10) Patent No.: US 12,521,049 B2
(45) Date of Patent: Jan. 13, 2026

(54) BIOLOGICAL FLUID SEPARATION DEVICE

(71) Applicant: BECTON DICKINSON AND COMPANY, Franklin Lakes, NJ (US)

(72) Inventors: Kristin Weidemaier, Raleigh, NC (US); Alexander G. Lastovich, Gilbert, AZ (US); Qihua Xu, Cary, NC (US); Richard Abbott, Raleigh, NC (US)

(73) Assignee: BECTON DICKINSON AND COMPANY, Franklin Lakes, NJ (US)

( * ) Notice: Subject to any disclaimer, the term of this patent is extended or adjusted under 35 U.S.C. 154(b) by 980 days.

(21) Appl. No.: 17/340,788

(22) Filed: Jun. 7, 2021

(65) Prior Publication Data

US 2021/0378567 A1 Dec. 9, 2021

Related U.S. Application Data

(60) Provisional application No. 63/036,822, filed on Jun. 9, 2020.

(51) Int. Cl.
*A61B 5/15* (2006.01)
*A61B 5/154* (2006.01)
*G01N 33/49* (2006.01)

(52) U.S. Cl.
CPC .... *A61B 5/150213* (2013.01); *A61B 5/15003* (2013.01); *A61B 5/150351* (2013.01);
(Continued)

(58) Field of Classification Search
CPC .......... A61B 5/150213; A61B 5/15003; A61B 5/150351; A61B 5/150755; A61B 5/154;
(Continued)

(56) References Cited

U.S. PATENT DOCUMENTS 5,435,970 A * 7/1995 Mamenta ............. G01N 33/491
435/14
9,649,061 B2 5/2017 Ivosevic et al.
(Continued)

FOREIGN PATENT DOCUMENTS

CN 108885203 A 11/2018
JP 2006517029 A 7/2006
(Continued)

OTHER PUBLICATIONS

International Search Report and Written Opinion for Application No. PCT/US21/36131 dated Oct. 4, 2021 (11 pages).
(Continued)

*Primary Examiner* — Jennifer Robertson
*Assistant Examiner* — Nidhi N Patel
(74) *Attorney, Agent, or Firm* — Botos Churchill IP Law LLP

(57) ABSTRACT

A blood separation device that allows high quality plasma to be generated using a single power source. The device includes a housing with an inlet port adapted to receive the blood sample, a first chamber having a first chamber flow channel in fluid communication with the inlet port, a second chamber having a second chamber flow channel, a separation member disposed between the first chamber and the second chamber. In some embodiments, the blood separation device detects or tests for the presence of a substance, such as an antigen or an antibody.

12 Claims, 22 Drawing Sheets

(52) U.S. Cl.
CPC ........ *A61B 5/150755* (2013.01); *A61B 5/154* (2013.01); *G01N 33/491* (2013.01)

(58) Field of Classification Search
CPC ............. G01N 33/491; B01L 3/502738; B01L 2200/0684; B01L 2300/0681; B01L 2300/0825; B01L 2300/0864; B01L 2300/087; B01L 3/50273; B01L 3/502753
See application file for complete search history.

(56) References Cited

U.S. PATENT DOCUMENTS

| | | | |
|---|---|---|---|
| 10,493,409 B2 | 12/2019 | Xu et al. | |
| 10,549,242 B2 | 2/2020 | Xu et al. | |
| 10,709,370 B2 | 7/2020 | Xu et al. | |
| 2005/0092662 A1 | 5/2005 | Gilbert et al. | |
| 2005/0106066 A1 | 5/2005 | Saltsman et al. | |
| 2016/0109467 A1* | 4/2016 | Kolb | B01L 3/50273 435/7.25 |
| 2017/0252706 A1* | 9/2017 | Xu | B01D 69/06 |
| 2017/0354362 A1 | 12/2017 | Xu et al. | |
| 2018/0071689 A1 | 3/2018 | Xu et al. | |

FOREIGN PATENT DOCUMENTS

| | | |
|---|---|---|
| JP | 2015172492 A | 10/2015 |
| JP | 2017538917 A | 12/2017 |
| JP | 2019513226 A | 5/2019 |
| JP | 2019520566 A | 7/2019 |
| WO | 2004065930 A2 | 8/2004 |
| WO | 2014182844 A1 | 11/2014 |
| WO | 2016105548 A1 | 6/2016 |
| WO | 2017151883 A2 | 9/2017 |
| WO | 2019058903 A1 | 3/2019 |

OTHER PUBLICATIONS

Japanese Office Action issued in corresponding JP application No. 2022-575864 on Mar. 7, 2025, pp. 12.
Article 94(3) Communication issued in EP Application No. 21737852.0 on Apr. 22, 2025, pp. 5.

* cited by examiner

| REFERENCE TRIGLYCERIDES CONCENTRATION (mg/dL) | MEAN INTERPOLATED TRIGLYCERIDES CONCENTRATION (mg/dL), N = 3 | DIFFERENCE (%) | CV (%) |
|---|---|---|---|
| 94 | 78.7 | 16% | 8.1 |
| 101 | 81.3 | 19% | 5.8 |
| 118 | 120.2 | 2% | 15 |

FIG.21

| FACTOR | THYROCHEK® CARTRIDGE | TEM-VERITOR™ CARTRIDGE | | |
| --- | --- | --- | --- | --- |
| | | SET 1 | SET 2 | SET 3 |
| LINEARITY ($R^2$) | 0.8754 | 0.9480 | 0.9732 | 0.9720 |

FIG.25

BIOLOGICAL FLUID SEPARATION DEVICE

CROSS REFERENCE TO RELATED APPLICATION

This application claims the benefit of U.S. Provisional Application No. 63/036,822 filed on Jun. 9, 2020 that is incorporated by reference herein.

BACKGROUND OF THE INVENTION

1. Field of the Disclosure

The present disclosure relates generally to devices adapted for use with biological fluids. More particularly, the present disclosure relates to devices adapted for separating components of biological fluids. The present disclosure also relates to devices that detect or test for the presence of a substance, such as an antigen or an antibody.

2. Description of the Related Art

Blood sampling is a common health care procedure involving the withdrawal of at least a drop of blood from a patient. Blood samples are commonly taken from hospitalized, homecare, and emergency room patients either by finger stick, heel stick, or venipuncture. Blood samples may also be taken from patients by venous or arterial lines. Once collected, blood samples may be analyzed to obtain medically useful information including chemical composition, hematology, or coagulation, for example.

Blood tests determine the physiological and biochemical states of the patient, such as disease, mineral content, drug effectiveness, and organ function. Blood tests may be performed in a clinical laboratory or at the point-of-care near the patient. One example of point-of-care blood testing is the routine testing of a patient's blood glucose levels which involves the extraction of blood via a finger stick and the mechanical collection of blood into a diagnostic cartridge. Thereafter, the diagnostic cartridge analyzes the blood sample and provides the clinician a reading of the patient's blood glucose level. Other devices are available which analyze blood gas electrolyte levels, lithium levels, and ionized calcium levels. Some other point-of-care devices identify markers for acute coronary syndrome (ACS) and deep vein thrombosis/pulmonary embolism (DVT/PE).

Blood samples contain a whole blood portion and a plasma portion. Plasma separation from whole blood has been traditionally achieved by centrifugation which typically takes 15 to 20 minutes and involves heavy labor or complex work flow. Recently there are other technologies that have been used or tried to separate plasma such as sedimentation, fibrous or non-fibrous membrane filtration, lateral flow separation, microfluidics cross flow filtration and other microfluidics hydrodynamic separation techniques. However, many of those technologies have various challenges arranging from poor plasma purity, analyte bias or requiring specific coating to prevent analyte bias, high hemolysis, requiring dilution, long separation time, and/or difficult to recover the plasma. For example, most membrane-based separation technologies suffer from an analyte bias problem, and often require specific coating treatments for the target analytes.

SUMMARY OF THE INVENTION

The present disclosure provides a blood separation device and a separation process that allows high quality plasma to be generated using a single power source.

In one exemplary embodiment, a disposable point-of-care (POC) microfluidic device has been developed with an integrated track-etch membrane (TEM) plasma separation technology that generates high quality plasma from whole blood using a single power source. The plasma separation process does not require any hardware or electric power. The device is operated by pressure which is manually generated by simply depressing and releasing a vacuum bulb at one end of the device. The quality of the separated plasma indicates excellent (low) bias for soluble analytes that is comparable to that of tube plasma generated by centrifugation. The separated plasma can potentially be used within the device in a variety of applications such as in colorimetric and chemistry assays, immunoassays as well as in lateral flow type tests. The user simply pipettes or dispenses a sample of whole blood into the single-use disposable device and then depresses and releases a vacuum bulb at one end of the device. Releasing the bulb creates internal vacuum pressure and draws the blood sample into the device where it flows tangentially over a track etch membrane. Vacuum pressure is also present on the opposite side of the TEM creating transmembrane pressure that pulls plasma through the membrane. In one embodiment, this separated plasma flows to a test area where it mixes with test and positive control reagents. The reagents may then potentially change color based on the amount of the targeted antigen present in the separated plasma. The color of each well in the disposable device can then be detected by a POC reader. Assay detection methods in the reader can vary and may be based on reflectance, absorbance, fluorescence, chemiluminescence, or other methods in order to verify the test is working properly, i.e., positive control, and to also report, at a minimum, either a positive or negative test result. As an alternative, the color intensity may potentially be used to quantitate the test result.

In another exemplary embodiment, the separated plasma may flow through a conjugate pad where the antigen of interest, if present in the plasma sample, pairs with detection antibodies within the conjugate pad. After leaving the conjugate pad, the plasma flows over to one or more pieces of nitrocellulose membrane or other similar types of 3-D structures containing capture antibodies. For samples containing the antigen of interest, the antigen plus detection antibodies pair with the capture antibodies in the membrane and a visible line or mark appears. The line on each membrane can then be detected by a POC reader where the test results are reported. In one embodiment, the detection antibodies are attached directly to the test area in the device or may be embedded in hydrogel located in the test area. This device then functions similarly with the plasma separated from blood flowing through a conjugate pad or other porous material containing the capture antibodies that pair with the antigen of interest. The plasma then flows from the conjugate pad or similar porous material to the test area where the antigen plus capture antibody pair with the detection antibodies, which again can be detected by a POC reader and the test results reported.

In yet another exemplary embodiment, a blood separation device is designed to replace an entire lateral flow strip with individual positive control and test marks on separate three-dimensional structures. It has been observed that nitrocellulose membranes as well as other types of membranes can introduce analyte bias that can skew a final test result. Therefore, the three-dimensional structure used in this device were significantly reduced to minimize those biasing effects. The plasma separation cartridge with membrane strips is designed to separate plasma from blood and flow the separated plasma through a conjugate pad containing detection antibodies to two different wells containing three-dimensional structure, e.g., small strips of nitrocellulose membrane, embedded with capture antibodies which change color based on the concentration of antigen present in the sample. This device is not strictly limited to using nitrocellulose membranes or typical conjugate pad materials. Other non-biasing three-dimensional structure, membranes or pads may instead be used.

In accordance with an embodiment of the present invention, a blood separation device adapted to receive a blood sample having a whole blood portion and a plasma portion includes a housing that includes an inlet port adapted to receive the blood sample, a first chamber having a first chamber flow channel in fluid communication with the inlet port, a second chamber having a second chamber flow channel, a separation member disposed between the first chamber and the second chamber; and an actuator disposed at least partially within the housing and in communication with the inlet port, the first chamber, and the second chamber, the actuator being transitionable between an original position and a depressed position, wherein after actuation of the actuator, as the actuator returns to the original position, the actuator applies a vacuum pressure to simultaneously draw the blood sample through the first chamber flow channel and the plasma portion through the separation member into the second chamber flow channel.

In one configuration, the housing further comprises a first well in fluid communication with the second chamber flow channel. In another configuration, the first well includes a first reagent. In yet another configuration, the housing further comprises a second well in fluid communication with the second chamber flow channel. In one configuration, the second well includes a second reagent. In another configuration, the plasma portion simultaneously flows into the first well and the second well. In yet another configuration, the device further comprises a whole blood reservoir in communication with the first chamber flow channel, wherein after the blood sample flows over the separation member, the whole blood portion flows into the whole blood reservoir. In one configuration, the device further comprises a plasma reservoir in communication with the first well and the second well, wherein, after the plasma portion fills the first well and the second well, excess plasma flows into the plasma reservoir. In another configuration, the housing includes a viewing window aligned with the first well and the second well, wherein the viewing window provides visualization of the first well and the second well from outside the housing. In yet another configuration, the device further comprises a first valve located inside the housing, the first valve being transitionable between a first valve open position and a first valve closed position; a second valve located inside the housing, the second valve being transitionable between a second valve open position and a second valve closed position; and a third valve located at an external wall of the housing, the third valve being transitionable between a third valve open position and a third valve closed position. In one configuration, with actuation of the actuator to the depressed position, the first valve is in the first valve closed position, the second valve is in the second valve closed position, and the third valve is in the third valve open position, and wherein, with the actuator transitioning from the depressed position to the original position, the first valve is in the first valve open position, the second valve is in the second valve open position, and the third valve is in the third valve closed position. In another configuration, the separation member is adapted to restrain the whole blood portion in the first chamber flow channel and allow the plasma portion to pass therethrough into the second chamber flow channel. In yet another configuration, the device further comprises a first vent adjacent the inlet port. In one configuration, the device further comprises a second vent adjacent the first well and the second well. In another configuration, the separation member comprises a track-etched membrane. In yet another configuration, the actuator is a push button.

In accordance with another embodiment of the present invention, a blood separation device adapted to receive a blood sample having a whole blood portion and a plasma portion includes a housing including an inlet port adapted to receive the blood sample, a first chamber having a first chamber flow channel in fluid communication with the inlet port, a second chamber having a second chamber flow channel, a separation member disposed between the first chamber and the second chamber; an actuator disposed at least partially within the housing and in communication with the inlet port, the first chamber, and the second chamber, the actuator being transitionable between an original position and a depressed position, wherein after actuation of the actuator, as the actuator returns to the original position, the actuator applies a vacuum pressure to simultaneously draw the blood sample through the first chamber flow channel and the plasma portion through the separation member into the second chamber flow channel; and a testing area in fluid communication with the second chamber flow channel, the testing area comprising: a first portion having a first testing substance; and a second portion having a second testing substance.

In one configuration, if the plasma portion contains an antigen, a positive condition is created in the second portion. In another configuration, if the plasma portion does not contain the antigen, a negative condition is created in the second portion. In yet another configuration, the plasma portion flows from the second chamber flow channel to the first portion of the testing area and if the plasma portion contains the antigen, the antigen pairs with the first testing substance, then the plasma portion and the first testing substance flow into the second portion of the testing area and the antigen and the first testing substance bind with the second testing substance to create the positive condition. In one configuration, after a second actuation of the actuator, as the actuator returns to the original position, the actuator applies a second vacuum pressure to draw the plasma portion through the second chamber flow channel to the first portion and the second portion of the testing area. In another configuration, the device further comprises a buffer that is introduced into the plasma portion and the testing area upon the second actuation of the actuator. In yet another configuration, the testing area includes a plasma separation compartment between the second chamber flow channel and the first portion of the testing area. In one configuration, the testing area includes a lateral flow strip. In another configuration, the first portion comprises a conjugate pad. In yet another configuration, the second portion comprises a three-dimensional structure. In one configuration, the first testing substance comprises a detection antibody. In another configuration, the second testing substance comprises a capture antibody. In yet another configuration, the device further comprises a whole blood reservoir in communication with the first chamber flow channel, wherein after the blood sample flows over the separation member, the whole blood portion flows into the whole blood reservoir. In one configuration, the device further comprises a plasma reservoir in communication with the testing area, wherein after the plasma portion fills the testing area, excess plasma flows into the plasma reservoir. In another configuration, the housing includes a viewing window aligned with the testing area, wherein the viewing window provides visualization of the testing area from outside the housing. In yet another configuration, the device further comprises a first valve located inside the housing, the first valve being transitionable between a first valve open position and a first valve closed position; a second valve located inside the housing, the second valve being transitionable between a second valve open position and a second valve closed position; and a third valve located at an external wall of the housing, the third valve being transitionable between a third valve open position and a third valve closed position. In one configuration, with actuation of the actuator to the depressed position, the first valve is in the first valve closed position, the second valve is in the second valve closed position, and the third valve is in the third valve open position, and wherein, with the actuator transitioning from the depressed position to the original position, the first valve is in the first valve open position, the second valve is in the second valve open position, and the third valve is in the third valve closed position. In another configuration, the separation member is adapted to restrain the whole blood portion in the first chamber flow channel and allow the plasma portion to pass therethrough into the second chamber flow channel. In yet another configuration, the separation member comprises a track-etched membrane. In one configuration, the actuator is a push button. In another configuration, the testing area includes membrane strips. In yet another configuration, the second portion includes a first recess containing a first membrane strip. In one configuration, the second portion further includes a second recess containing a second membrane strip. In another configuration, the first portion comprises a conjugate pad. In yet another configuration, the first testing substance comprises a detection antibody. In one configuration, the second testing substance comprises a capture antibody.

BRIEF DESCRIPTION OF THE DRAWINGS

The above-mentioned and other features and advantages of this disclosure, and the manner of attaining them, will become more apparent and the disclosure itself will be better understood by reference to the following descriptions of embodiments of the disclosure taken in conjunction with the accompanying drawings, wherein:

FIG. 21 shows a comparison of the measured triglycerides concentration using AMS clinical chemistry analyzer and an embodiment of the blood separation device of the present invention.

FIG. 23A shows an exemplary TSH assay using a blood separation device in accordance with an embodiment of the present invention; FIGS. 23B and 23C show images of exemplary TSH assays using the blood separation device of FIG. 23A.

FIG. 25 shows a comparison of the measured TSH concentration using a Thyrocheck® cartridge and an embodiment of the blood separation device of the present invention.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Figure 1:
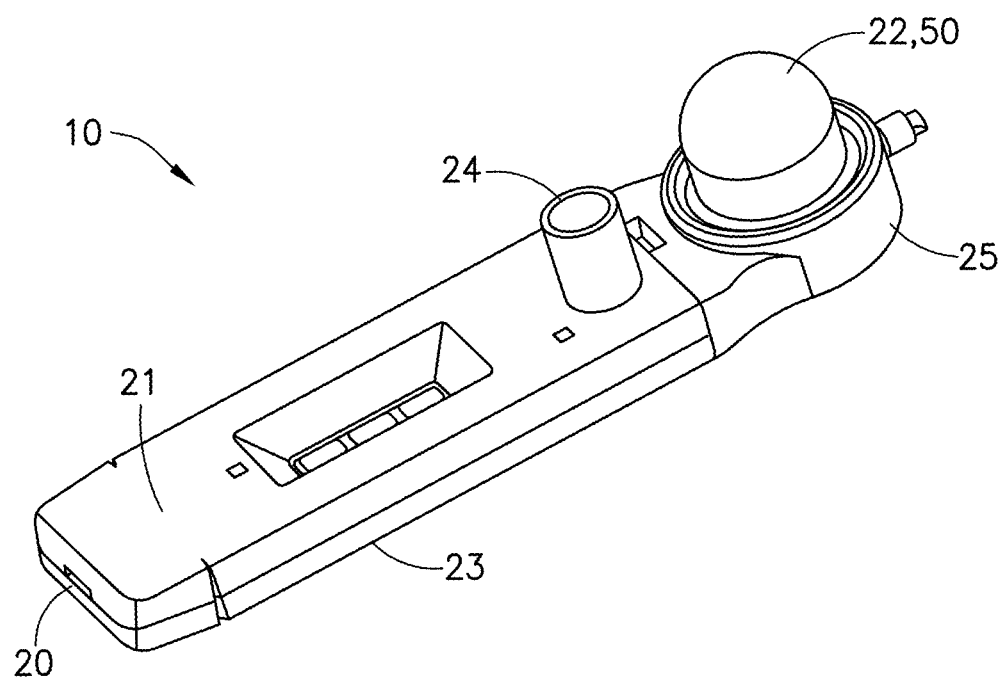
FIG. 1 is a perspective view of a blood separation device in accordance with an embodiment of the present invention.
Figure 2:
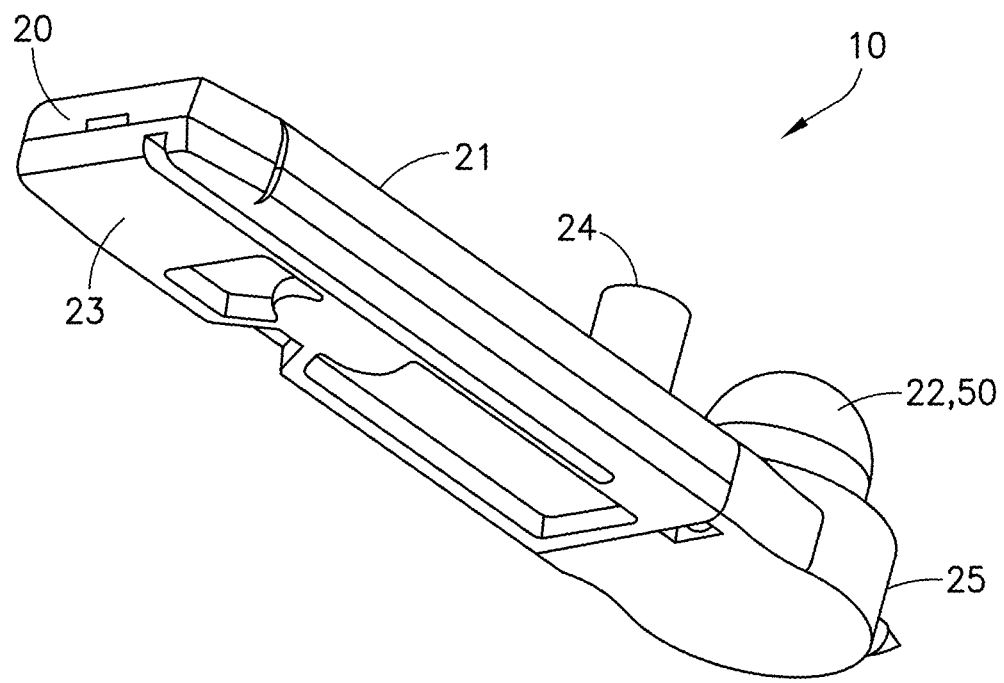
FIG. 2 is a second perspective view of a blood separation device in accordance with an embodiment of the present invention.
Figure 3:
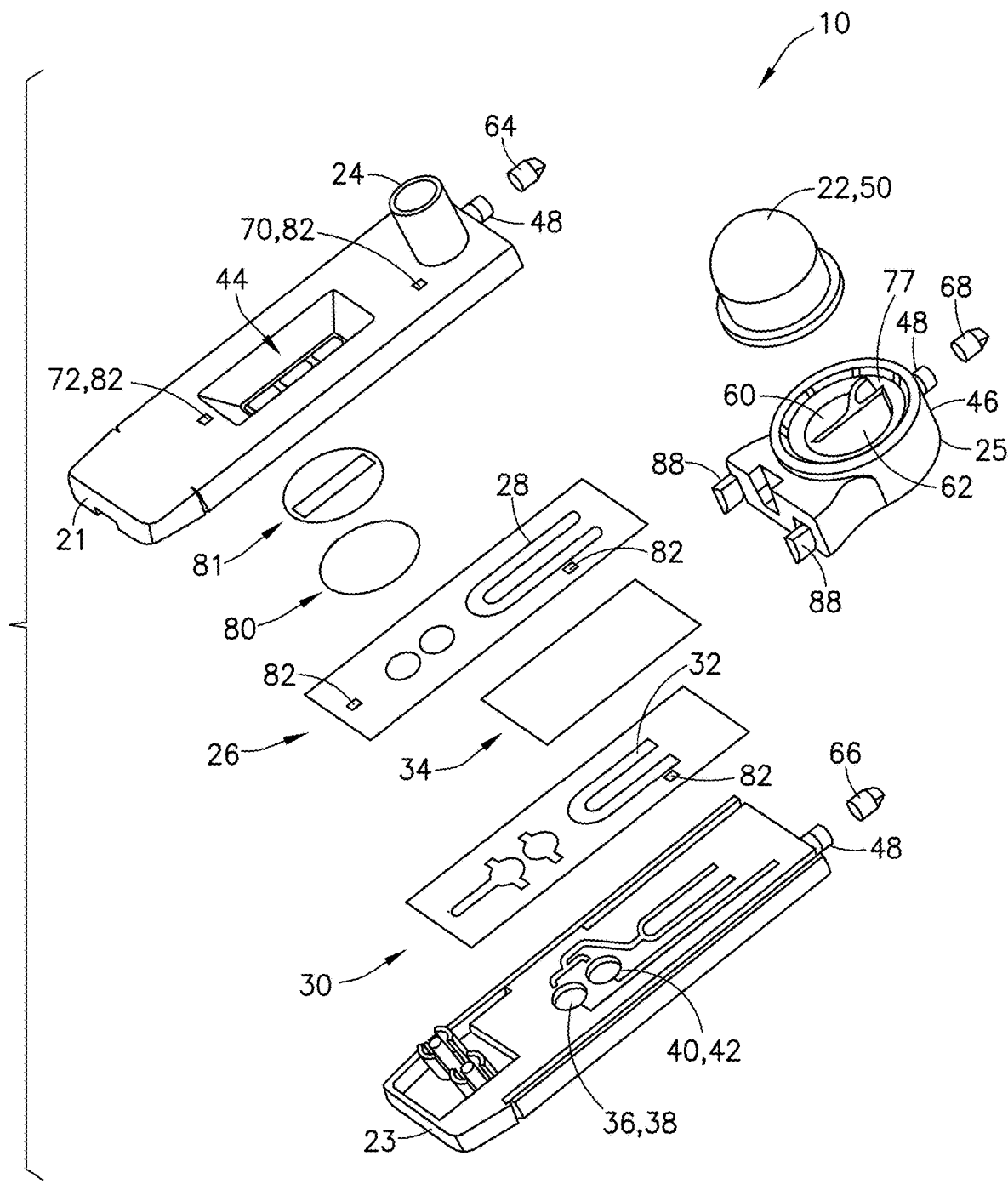
FIG. 3 is an exploded view of a blood separation device in accordance with an embodiment of the present invention.
Figure 4:
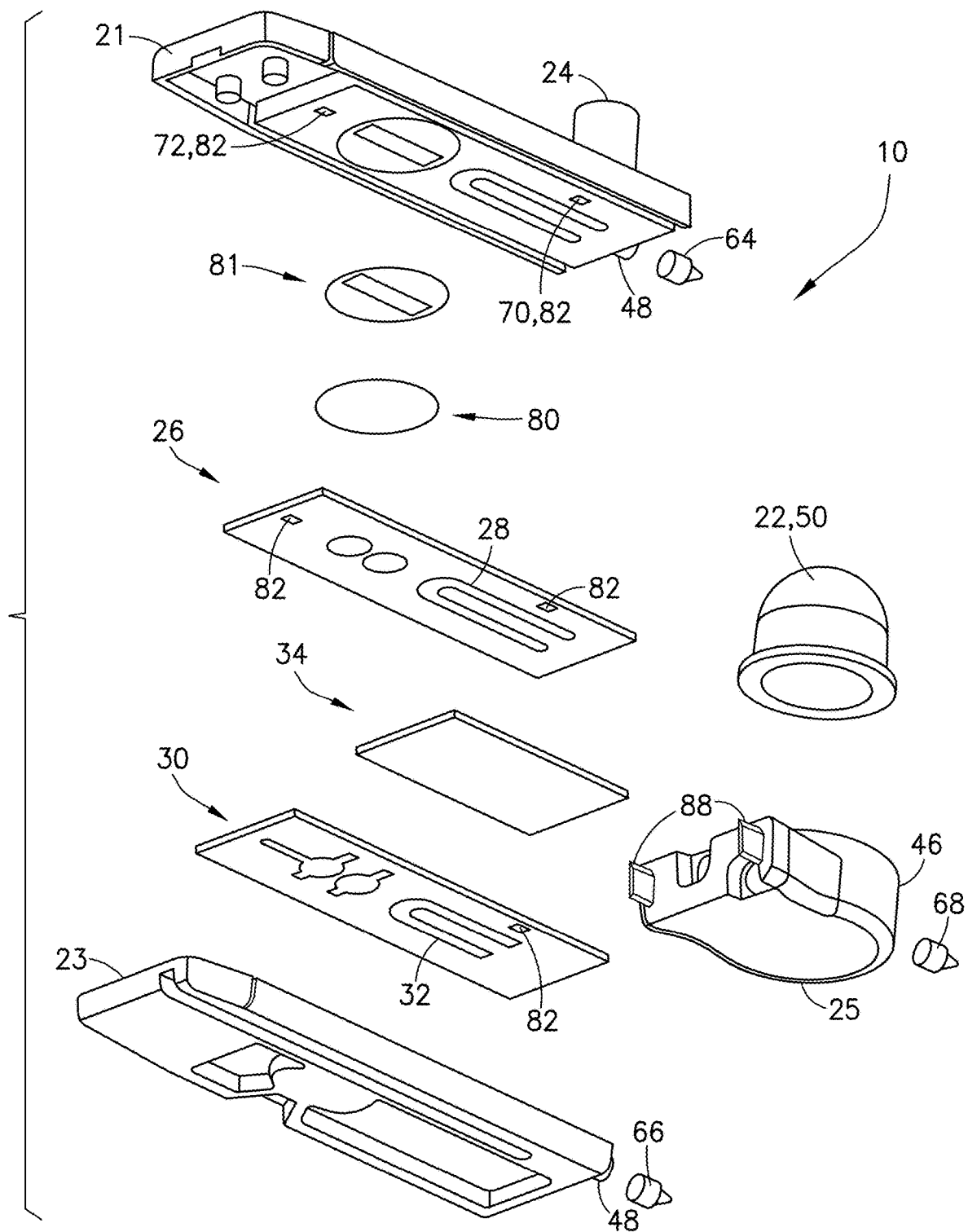
FIG. 4 is a second exploded view of a blood separation device in accordance with an embodiment of the present invention.
Figure 5:
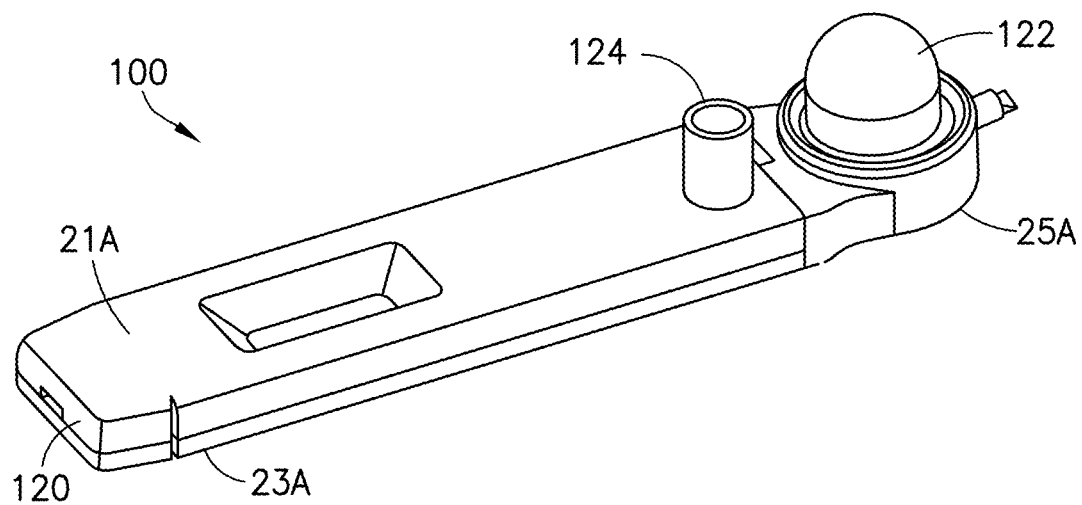
FIG. 5 is a perspective view of a blood separation device in accordance with another embodiment of the present invention.
Figure 6:
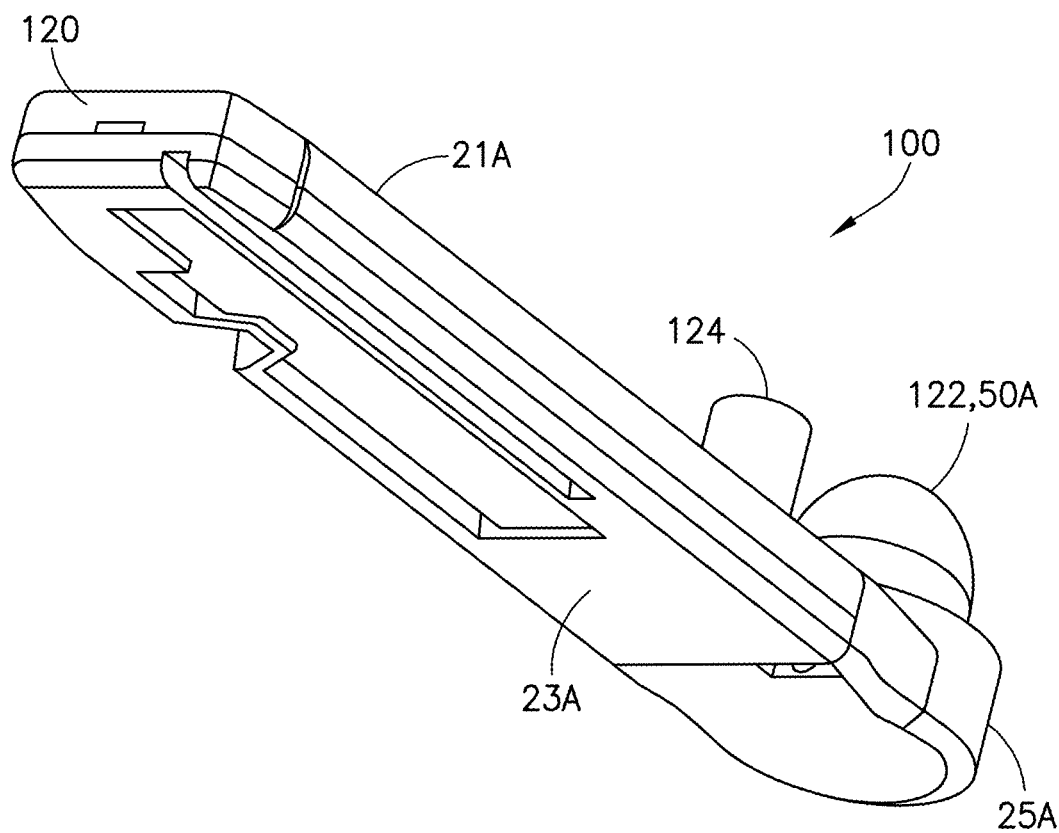
FIG. 6 is a second perspective view of a blood separation device in accordance with another embodiment of the present invention.
Figure 7:
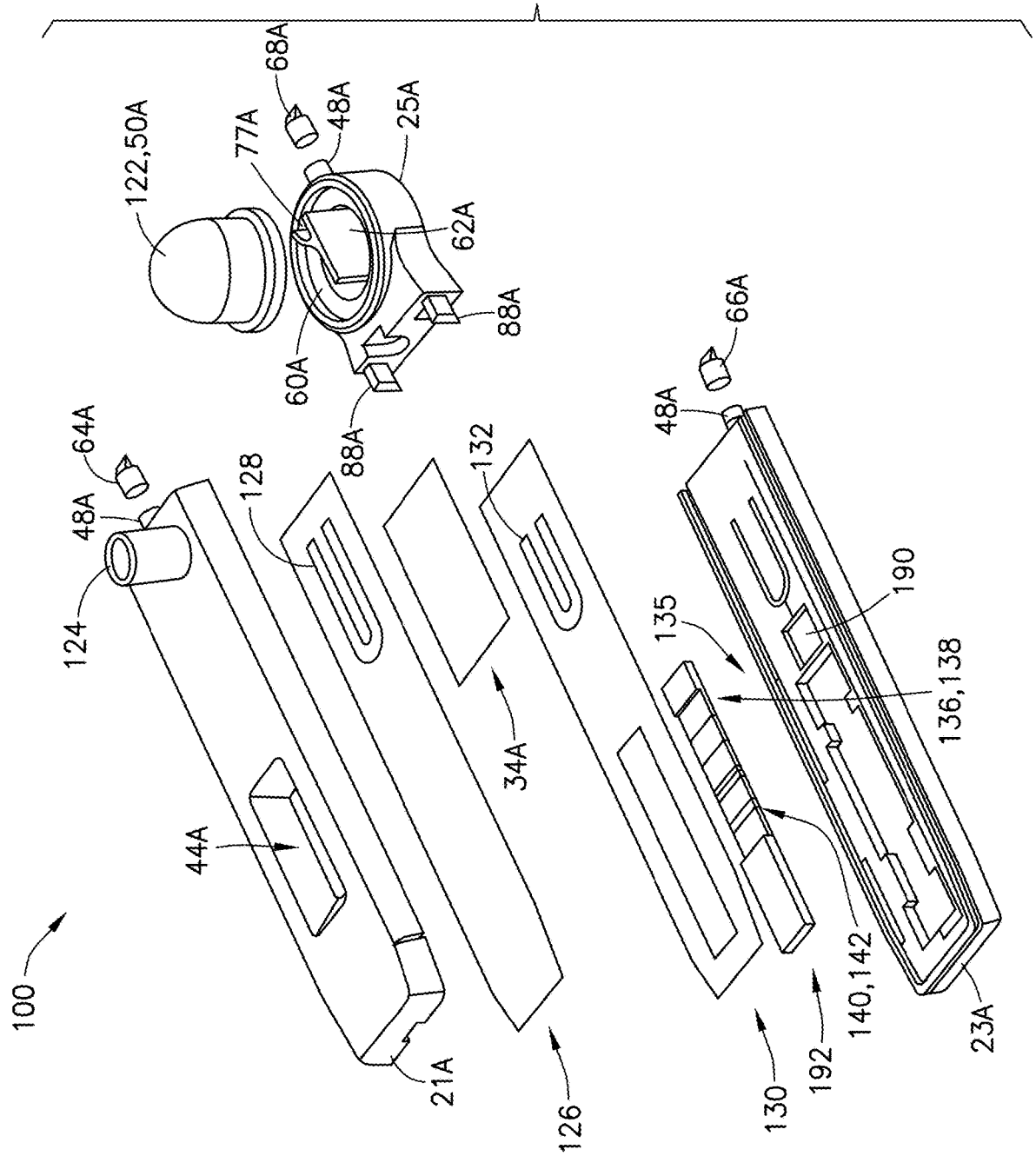
FIG. 7 is an exploded view of a blood separation device in accordance with another embodiment of the present invention.
Figure 8:
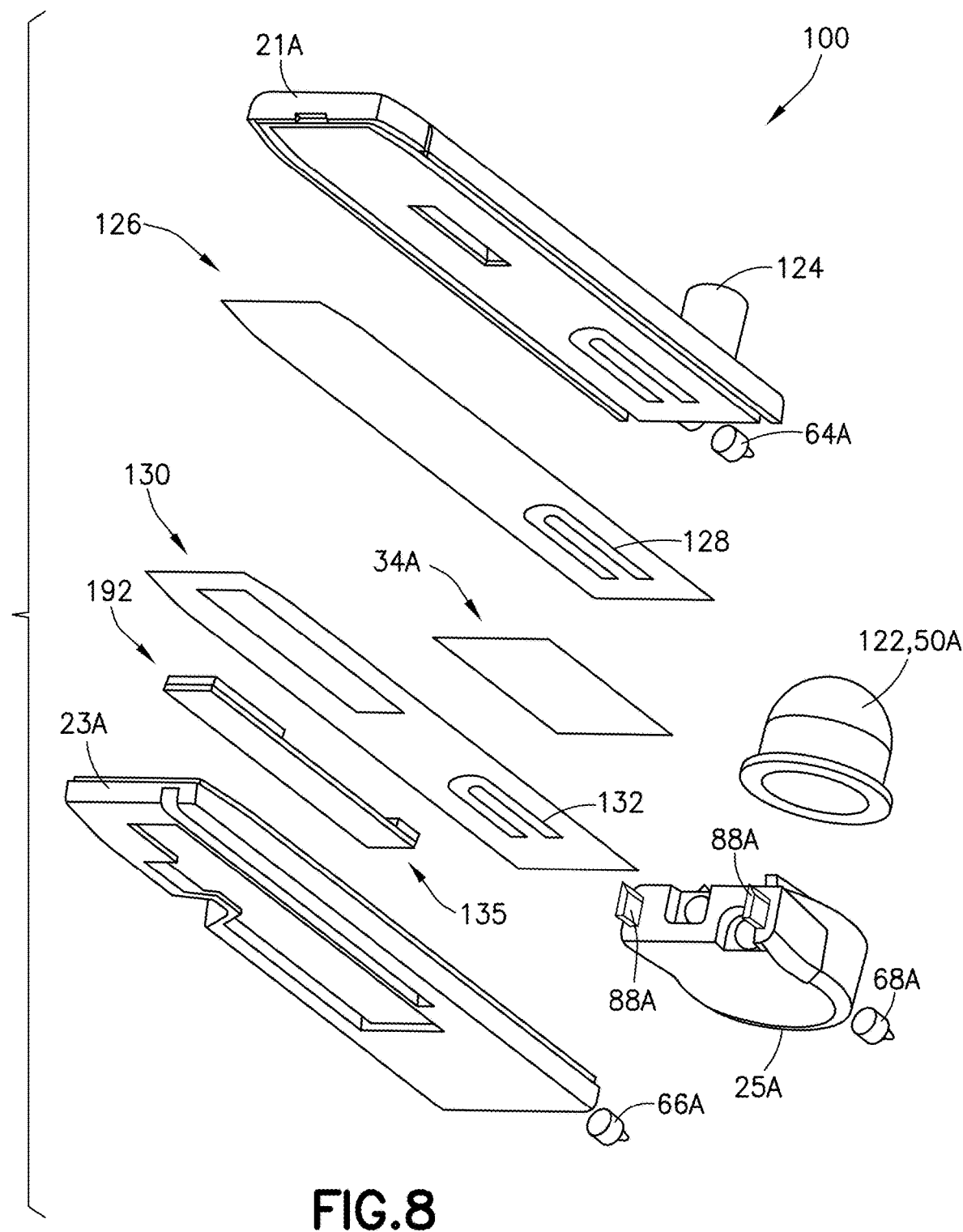
FIG. 8 is a second exploded view of a blood separation device in accordance with another embodiment of the present invention.
Figure 9:
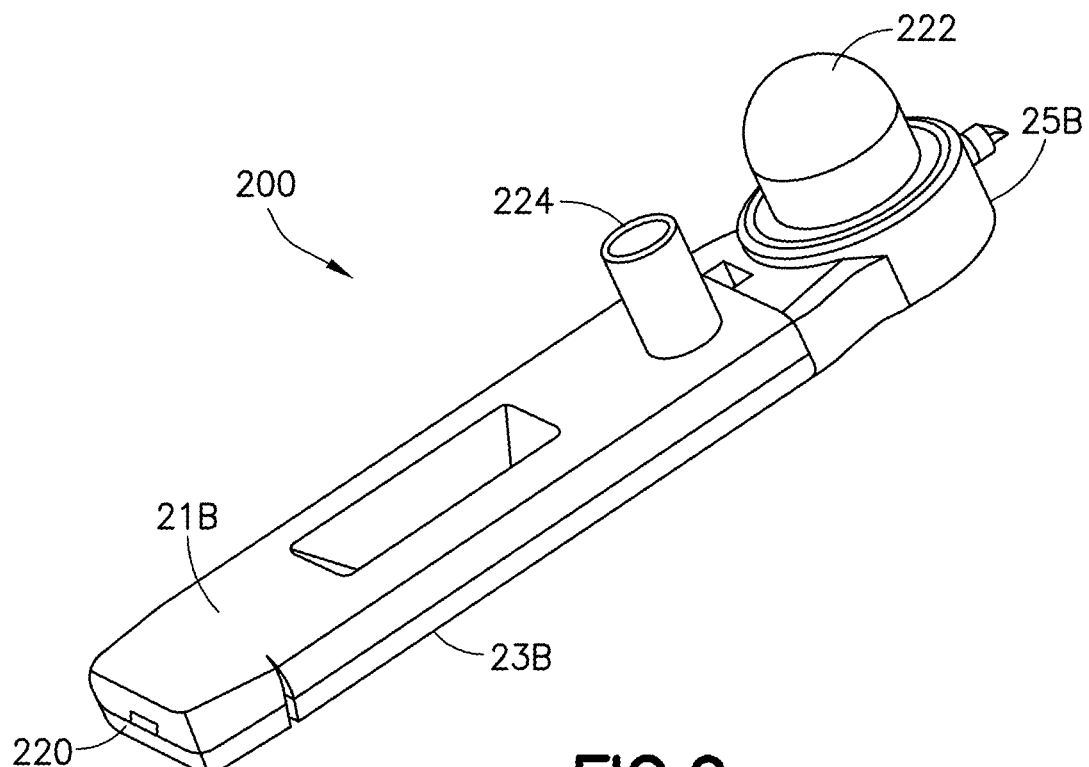
FIG. 9 is a perspective view of a blood separation device in accordance with another embodiment of the present invention.
Figure 10:
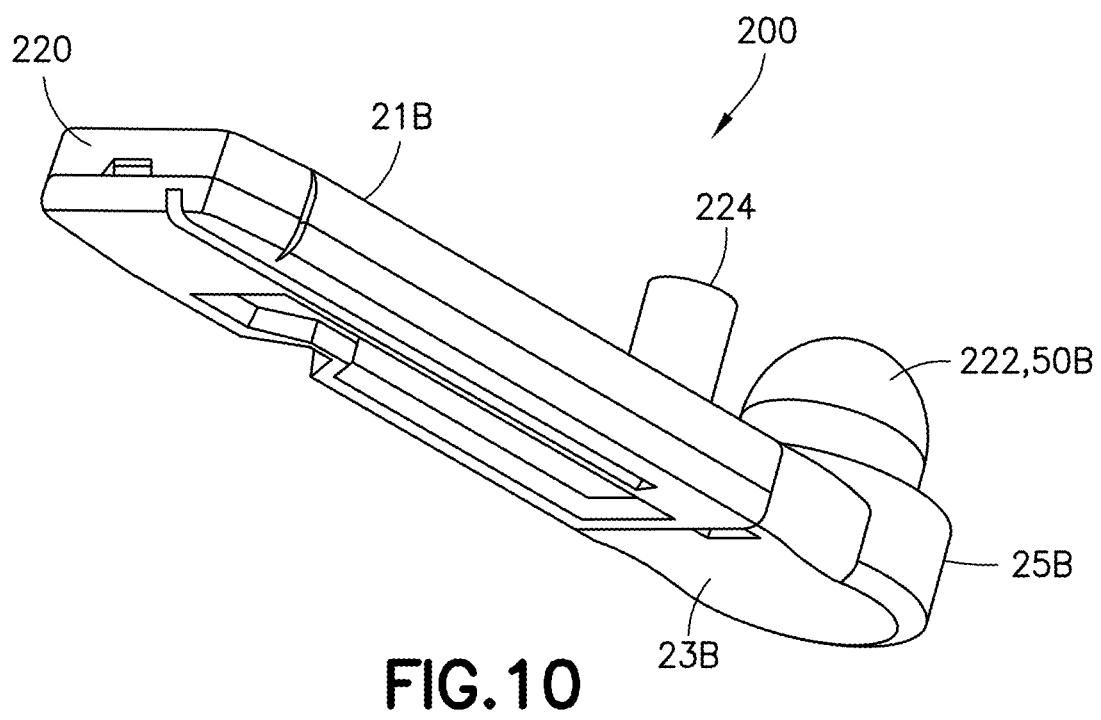
FIG. 10 is a second perspective view of a blood separation device in accordance with another embodiment of the present invention.
Figure 11:
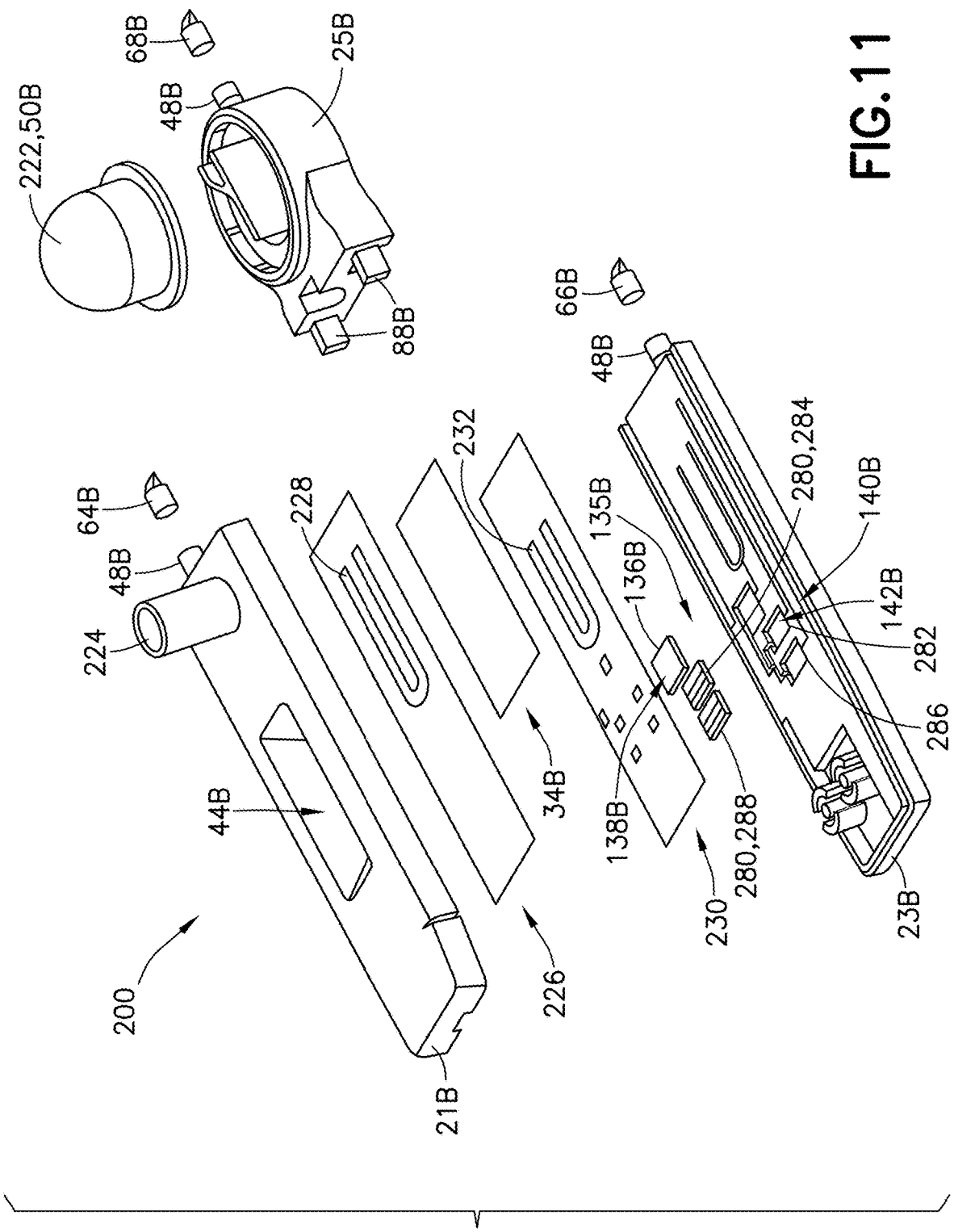
FIG. 11 is an exploded view of a blood separation device in accordance with another embodiment of the present invention.
Figure 12:
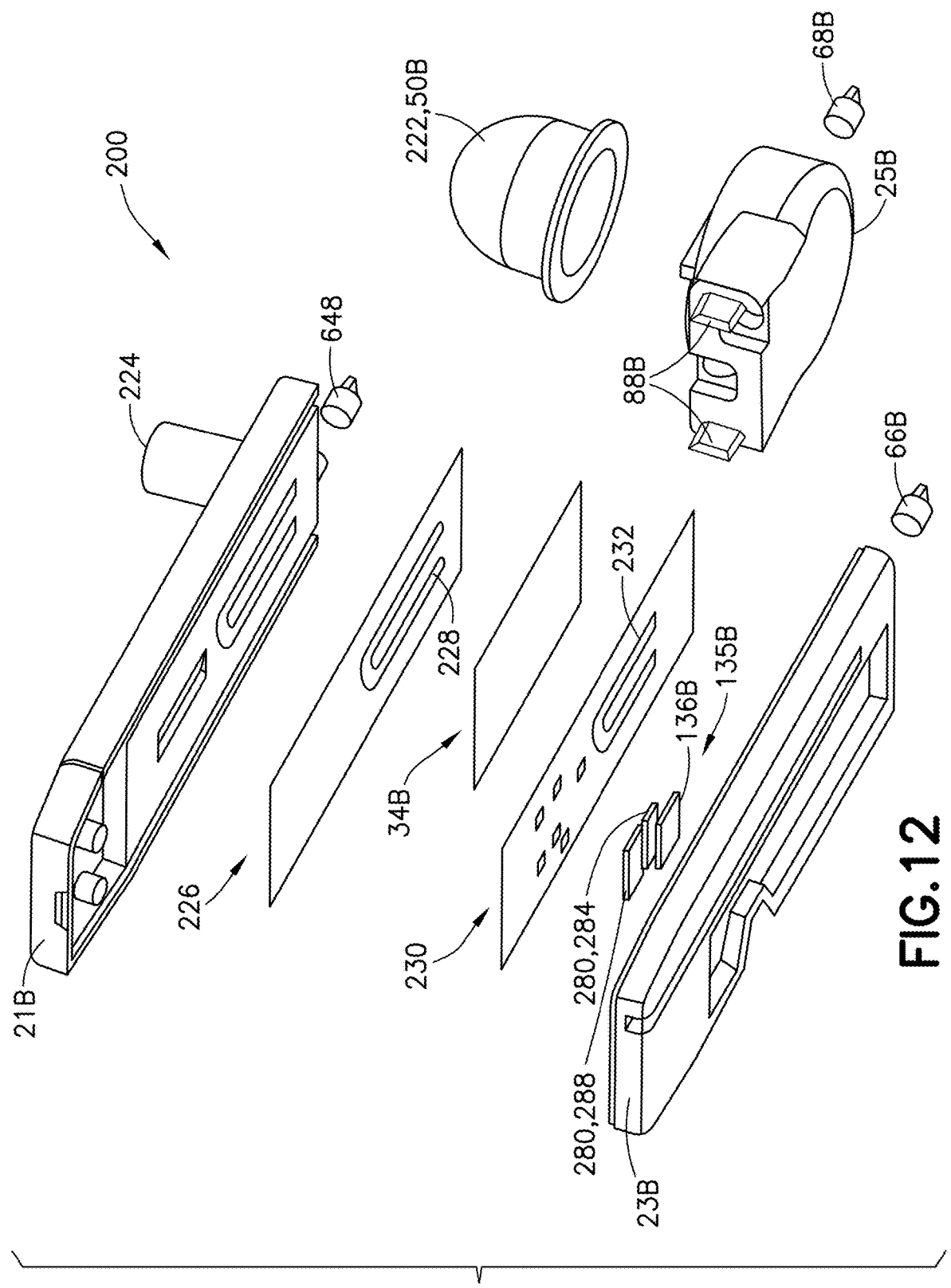
FIG. 12 is a second exploded view of a blood separation device in accordance with another embodiment of the present invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The present disclosure provides a blood separation device and a separation process that allows high quality plasma to be generated using a single power source.

Figure 13:
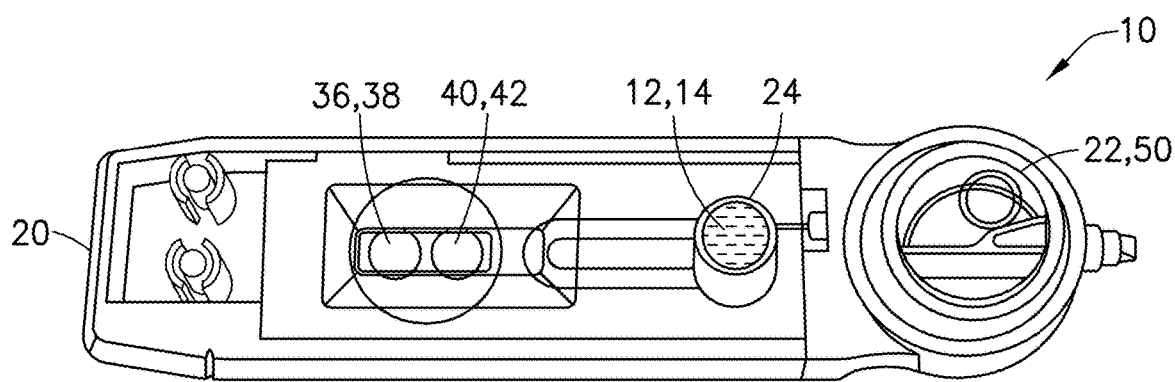
FIG. 13 is a top perspective view of a first step of using a blood separation device in accordance with an embodiment of the present invention.
Figure 14:
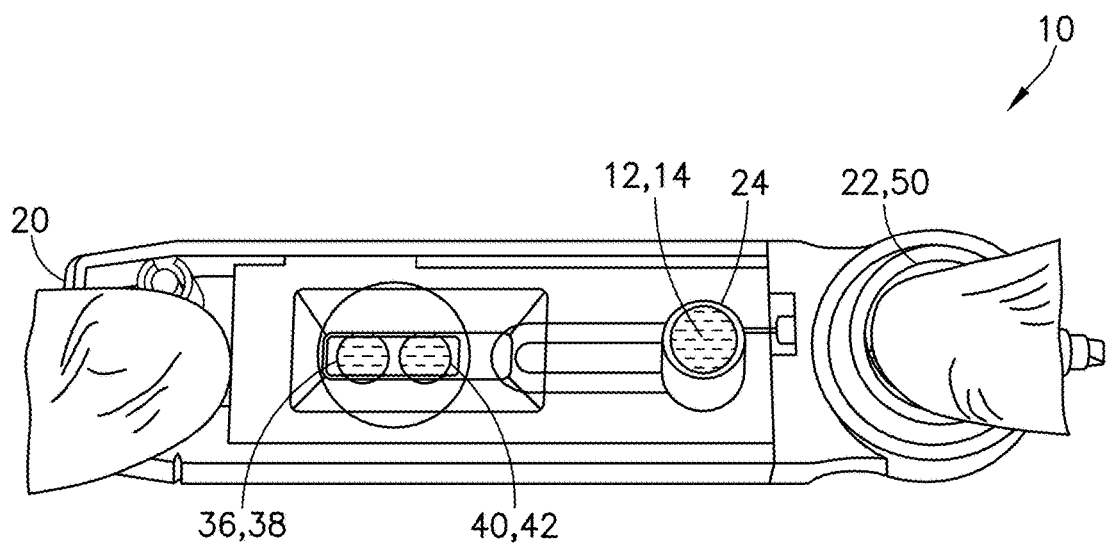
FIG. 14 is a top perspective view of a second step of using a blood separation device in accordance with an embodiment of the present invention.
Figure 15:
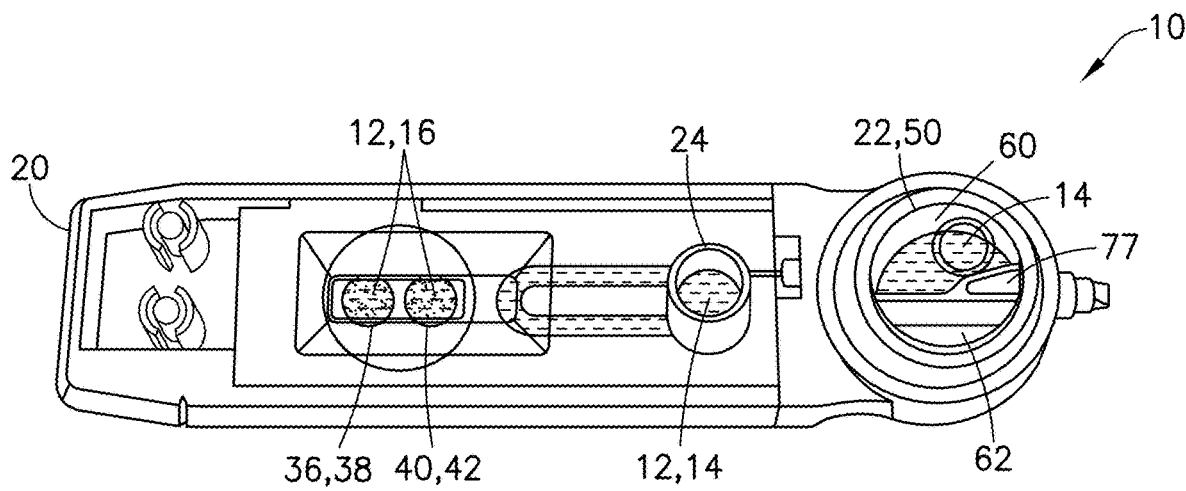
FIG. 15 is a top perspective view of a third step of using a blood separation device in accordance with an embodiment of the present invention.

FIGS. 1-4 illustrate an exemplary embodiment of a blood separation device 10 of the present disclosure. Referring to FIGS. 1-4, a blood separation device 10 of the present disclosure is adapted to receive, as illustrated in FIGS. 13-15, e.g., a blood sample 12 having a whole blood portion 14 and a plasma portion 16. The present disclosure provides a blood separation device and a separation process that allows high quality plasma to be generated using a single power source.

In one exemplary embodiment, a disposable point-of-care (POC) microfluidic blood separation device 10 includes integrated track-etch membrane (TEM) plasma separation technology that generates high quality plasma from whole blood using a single power source. The plasma separation process does not require any hardware or electric power. The device is operated by pressure which is manually generated by simply depressing and releasing a vacuum bulb at one of the device. The quality of the separated plasma indicates excellent (low) bias for soluble analytes that is comparable to that of tube plasma generated by centrifugation. The separated plasma can potentially be used within the device in a variety of applications such as in colorimetric and chemistry assays, immunoassays, as well as in lateral flow type tests. The user simply pipettes or dispenses a sample of whole blood into the single-use disposable device and then depresses and releases a vacuum bulb at one end of the device. Releasing the bulb creates internal vacuum pressure and draws the blood sample into the device where it flows tangentially over a track etch membrane. Vacuum pressure is also present on the opposite side of the TEM creating transmembrane pressure that pulls plasma through the membrane. In one embodiment, this separated plasma flows to a test area where it mixes with test and positive control reagents. The reagents may then potentially change color based on the amount of the targeted antigen present in the separated plasma. The color of each well in the disposable device can then be detected by a POC reader. Assay detection methods in the reader can vary and may be based on reflectance, absorbance, florescence, chemiluminescence, or other methods in order to verify the test is working properly, i.e., positive control, and to also report, at a minimum, either a positive or negative test result. As an alternative, the color intensity may potentially be used to quantitate the test result.

Referring to FIGS. 1-4, a blood separation device 10 generally includes a housing 20 and an actuator 22. In one embodiment, the housing 20 may include a top component 21, a bottom component 23, and a third or thumb component 25. In one exemplary embodiment, the housing 20 includes an inlet port 24 adapted to receive the blood sample 12, a first or blood chamber 26 having a first chamber flow channel 28 in fluid communication with the inlet port 24, a second or plasma chamber 30 having a second chamber flow channel 32, and a separation member 34 disposed between the first chamber 26 and the second chamber 30. The separation member 34 is adapted to restrain the whole blood portion 14 in the first chamber flow channel 28 and allow the plasma portion 16 to pass therethrough into the second chamber flow channel 32. In one embodiment, the separation member 34 comprises a track-etched membrane.

In one exemplary embodiment, the housing 20 also includes a first well 36 in fluid communication with the second chamber flow channel 32 and a second well 40 in fluid communication with the second chamber flow channel 32. In one embodiment, the first well 36 includes a first reagent 38 and the second well 40 includes a second reagent 42.

In one exemplary embodiment, the housing 20 also includes a viewing window 44 that is aligned with the first well 36 and the second well 40. In this manner, the viewing window 44 provides visualization of the first well 36 and the second well 40 from outside the housing 20.

In one exemplary embodiment, the actuator 22 is disposed at least partially within the housing 20 and in communication with the inlet port 24, the first chamber 26, and the second chamber 30. The actuator 22 of the blood separation device 10 is transitionable between an original position (FIGS. 13 and 15) and a depressed position (FIG. 14). In one embodiment, the actuator 22 is a push button 50.

Referring to FIGS. 1-4, the blood separation device 10 also includes a whole blood reservoir 60, a plasma reservoir 62, a first valve 64, a second valve 66, a third valve 68, a first vent 70, and a second vent 72.

In one exemplary embodiment, the whole blood reservoir 60 is in communication with the first chamber flow channel 28. The plasma reservoir 62 is in communication with the first well 36 and the second well 40. The first valve 64 is located inside the housing 20 and the first valve 64 is transitionable between a first valve open position and a first valve closed position. The second valve 66 is located inside the housing 20 and the second valve 66 is transitionable between a second valve open position and a second valve closed position. The third valve 68 is located at an external wall 46 of the housing 20 and the third valve 68 is transitionable between a third valve open position and a third valve closed position. In one embodiment, the first vent 70 is adjacent the inlet port 24 and the second vent 72 is adjacent the first well 36 and the second well 40.

As described in more detail below, in one exemplary embodiment, after actuation (FIG. 14) of the actuator 22, as the actuator 22 returns to the original position (FIGS. 13 and 15), the actuator 22 applies a vacuum pressure to simultaneously draw the blood sample 12 through the first chamber flow channel 28 and the plasma portion 16 through the separation member 34 into the second chamber flow channel 32. In one embodiment, the plasma portion 16 simultaneously flows into the first well 36 and the second well 40.

As described in more detail below, in one exemplary embodiment, with actuation (FIG. 14) of the actuator 22 to the depressed position (FIG. 14), the first valve 64 is in the first valve closed position, the second valve 66 is in the second valve closed position, and the third valve 68 is in the third valve open position, and wherein, with the actuator 22 transitioning from the depressed position (FIG. 14) to the original position (FIGS. 13 and 15), the first valve 64 is in the first valve open position, the second valve 66 is in the second valve open position, and the third valve 68 is in the third valve closed position.

As described in more detail below, in one exemplary embodiment, after the blood sample 12 flows over the separation member 34, the whole blood portion 14 flows into the whole blood reservoir 60 and after the plasma portion 16 fills the first well 36 and the second well 40, excess plasma 16 flows into the plasma reservoir 62.

Referring to FIGS. 1-4, the blood separation device 10 of the present disclosure is designed to separate plasma 16 from a blood sample 12 and flow the separated plasma 16 to two different wells, e.g., a first well 36 and a second well 40, within the device 10 where it can mix with reagents or antibodies, e.g., a first reagent 38 and a second reagent 42, if desired. In one exemplary embodiment, the top component 21 contains an inlet port 24 that is designed to hold a sample volume, e.g., of up to 350 µL which is a typical sample type of human whole blood. After filling the inlet port 24, the blood sample 12 is drawn into the device 10 by depressing the actuator 22, e.g., push button 50, located at one end of the device 10 and then releasing it. The device 10 contains a series of three (3) one-way valves 64, 66, 68 that operate in conjunction with the actuator 22 action to create and release vacuum pressure within the device 10. When the actuator 22 is depressed, the two one-way valves 64, 66 located internally in the device 10 close while the one-way valve 68 located at the end of the device 10 opens to exhaust and relieves internal cartridge pressure which prevents blood 12 from being ejected out of the inlet port 24. When the actuator 22 is released, the one-way exhaust valve 68 on the end of the device 10 closes and the two (2) internal one-way valves 64, 66 open to create internal vacuum pressure that draws the blood sample 12 into the device 10.

As discussed above, the separation member 34 is adapted to restrain the whole blood portion 14 in the first chamber flow channel 28 and allow the plasma portion 16 to pass therethrough into the second chamber flow channel 32. In one embodiment, the separation member 34 comprises a track-etched membrane. In one exemplary embodiment, a small track-etched membrane (TEM) is disposed between a first or blood chamber 26 and a second or plasma chamber 30. In one embodiment, the blood and plasma chamber combination 26, 30 is then assembled between the top and bottom components 21, 23 of the housing 20, as shown in FIGS. 1-4. The two (2) internal one-way valves 64, 66 may be attached horizontally to vacuum port posts 48 located at the ends of both the top and bottom components 21, 23. After assembly, both valves 64, 66 are then inserted into mating ports in the thumb component 25 of housing 20 that contains the actuator 22. When internal device vacuum pressure is activated via the actuator 22, the valve 64 attached to the top component 21 of the housing 20 opens and the blood sample 12 is drawn into the device 10 where it flows around the first chamber flow channel 28, e.g., the "U" shaped channel, in the blood or first chamber 26 and tangentially across the separation member 34 below the first chamber 26. The valve 66 attached to the base or bottom component 23 of the housing also opens at the same time which creates a differential vacuum pressure across the separation member 34 (known as transmembrane pressure). As blood 12 flows tangentially across the separation member 34, the transmembrane pressure pulls plasma 16 through the membrane pores of the separation member 34 and into the channel 32 of the plasma or second chamber 30. After flowing over the separation member 34, the used whole blood 14 of the blood 12 exits the blood chamber 26 via the valve 64 and drains into a first or left or whole blood reservoir or compartment 60 in the thumb component 25. The separated plasma 16 is then routed through a channel 78 in the base component 23 of the housing 20 over to the first and second wells 36, 40. See FIGS. 16-17. Just prior to reaching the wells 36, 40, the molded channel 78 is split into two separate branches, e.g., one for each well so that each well fills simultaneously, which prevents cross-contamination between the wells. After filling the wells 36, 40, excess plasma 16 is drained through the valve 66 connected to the base component 23 of the housing 20 and into a second or right compartment or plasma reservoir 62 of the thumb component 25.

As discussed above, in one exemplary embodiment, the housing 20 also includes a viewing window 44 that is aligned with the first well 36 and the second well 40. In this manner, the viewing window 44 provides visualization of the first well 36 and the second well 40 from outside the housing 20.

For example, in one exemplary embodiment, the viewing window 44 may include a thin round optically clear glass slide 80 and corresponding adhesive disc with imaging window cutout 81 that are disposed between the top component 21 of the housing 20 and blood or first chamber 26. The glass slide 80 is located directly above the test and positive control wells 36, 40 with an open window 44 included in the top component 21 above the glass slide 80 to provide clear viewing of both wells 36, 40 through the glass slide 80 as needed after plasma separation. The glass slide 80 and top component open window 44 design are only needed for 3-D printed prototype versions of the top component 21 which is printed using a semi-transparent material, e.g., Vero clear. The color of the test and positive control well contents become hazy and less distinct when viewed directly through the Vero clear material. When the top component 21 is injection molded using clear plastic such as PMMA, polycarbonate, PET, COC, etc., the imaging window 44 will be solid clear plastic eliminating the need for the glass slide 80 and corresponding adhesive disc. The base and thumb components 23, 25 are also currently 3-D printed parts that are fabricated using Vero white printing material; however, they can also be constructed of injection molded acrylonitrile butadiene styrene (ABS), polypropylene, polyethylene, polyurethane, polystyrene, PMMA polycarbonate, PET, COC or other types of material.

In an exemplary embodiment, the blood separation device 10 of the present disclosure includes a top component 21 of the housing 20 that contains an inlet port 24 capable of accepting sample volumes up to 350 µL. The input port volume is not limited to 350 µL and other volumes may be used as needed, e.g., larger than 0.5 mL or smaller than 100 µL.

In one exemplary embodiment, the blood separation device 10 includes valves 64, 66, 68 that are duckbill valves. The duckbill valves may be constructed of VMQ (silicone elastomer). In other embodiments, other materials or one-way valve types can be used. The top component 21 contains a 40 micron tall "U" shaped ridge designed to mate with the channel 28 of the first or blood chamber 26. In one embodiment, the blood chamber 26 is constructed of 78 microns thick double-sided acrylic adhesive tape on a polyester substrate. The 40 micron tall "U" shaped ridge in the top component 21 is designed to reduce the blood chamber "U" channel 28 height in order to flow a thinner layer of blood across the separation member 34 with the intent of increasing plasma separation efficiency. The separation member 34 may be a track-etched membrane with 0.4 µm pore size and that is 28.5 mm long×17.5 mm wide. The top component 21 may also contain a 15.5 mm circular recess 0.23 mm deep to mate with the thin clear glass slide 80 and double-sided adhesive tape. The glass slide 80 may be 15 mm diameter, 0.15 mm thick and made from borosilicate glass; however, other inert glass materials and slide thicknesses can be used. The same double-sided adhesive tape used for the blood chamber 26 may be also used for the glass slide tape. A rectangular cutout designed into the glass slide adhesive tape aligns with the rectangular opening in the top component imaging window. In addition, two circular 5.25 mm diameter cutouts were designed into both the blood and plasma chambers 26, 30 and, when combined with the rectangular window cutouts 81, the glass slide 80, and the viewing window 44 in the top component 21 of the housing 20, allow clear viewing access through the glass slide 80 to the test and positive control wells 36, 40 located in the base component 23 of the housing 20. As noted earlier, this design can be simplified to remove the clear glass slide and adhesive tape when the top component 21 is switched from 3-D printed to transparent plastic injection molded parts, e.g., PMMA, PC, PET, COC, etc.

In one exemplary embodiment, two vent holes 82 are included in the top component 21 as well as in both the blood and plasma chambers 26, 30. The vent hole 82 located adjacent to the inlet port 24 is designed to relieve residual vacuum pressure within the device 10 while the vent hole 82 adjacent to a well 36, 40 allows air, i.e., oxygen, to mix with the test well contents. The vent holes 82 are covered during the vacuum sequence, e.g., with single-sided adhesive tape. After completion of the plasma separation process, the tape over the blood input port vent hole 82 is removed first before removing the tape over the test well vent hole. This method prevents air bubbles from forming in the test well 36 when removing the test well vent hole tape. After the test well vent tape is removed, air enters the device 10 through a vent where it mixes with the plasma plus reagent in the test well 36. Some colorimetric assays require oxygen during the chemical reaction in order for the reagent to change colors. The amount or shade of color change is based on the amount of antigen present in the sample. The difference in this color change could then be used to quantitate the concentration of antigen in the sample. In an exemplary embodiment, the top component 21 contains two boss features with alignment holes that couple with posts in the base component to ensure consistent alignment of the blood and plasma chamber features such as the "U" channels, test and control well openings and vent hole openings.

In one exemplary embodiment, the base component 23 of the housing 20 contains a vacuum port post 48 that engages the valve 66 in the same manner as described above with respect to the valve 64 with the top component 21 of the housing 20. In an exemplary embodiment, the base component 23 of the housing 20 may also include two (2) "U" shaped ribs plus fill and drain channels as well as test and positive control wells 36, 40 molded into the component. The two (2) 40 micron tall "U" shaped ribs are each 0.35 mm wide and spaced 0.6 mm apart. The ribs are designed to mate with the plasma chamber "U" channel 32 to prevent the separation member 34 from sagging during plasma separation which can reduce or stop plasma 16 from flowing further into the device 10. In one embodiment, a 0.6 mm wide×0.3 mm deep fill channel is designed in the base component 23 to route separated plasma 16 collected in the plasma chamber "U" channel 32 over to two (2) 5 mm diameter×1 mm deep wells, capacity of each well is 20 µL. It is envisioned that the number of wells and the capacity of each well in the device 10 of the present disclosure is not limited to two (2) wells 36, 40 and can range from 1 or more wells depending on the size, shape and capacity of each well which can be at least 2 µL or more.

Figure 16:
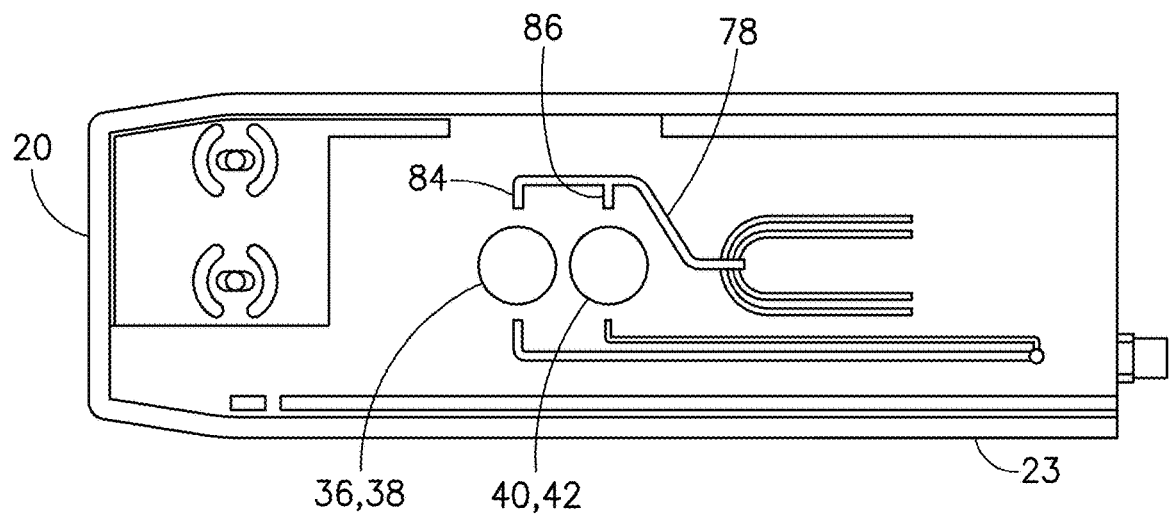
FIG. 16 is a top perspective view of a branched fill channel of a blood separation device in accordance with an embodiment of the present invention.
Figure 17:
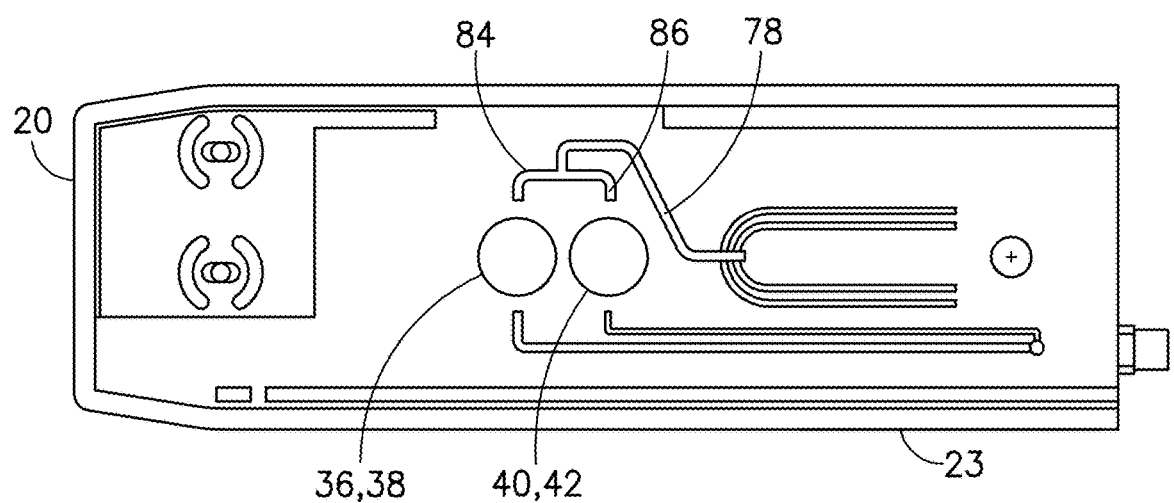
FIG. 17 is a top perspective view of a branched fill channel of a blood separation device in accordance with another embodiment of the present invention.

Referring to FIGS. 16 and 17, in one exemplary embodiment, before a branched channel 78 reaches the wells 36, 40, it is split into two branches, e.g., a first branch 84 and a second branch 86, with one branch routing to each well 36, 40. The branched channels 84, 86 stop just short of and are not physically connected to either well 36, 40. In one embodiment, cutouts in the plasma chamber 30 tape route the plasma 16 up and out of the branched channel 78, across the face of the base component 23 where it streams separately into each well 36, 40 which prevents cross-contamination between the wells 36, 40. In one exemplary embodiment, the plasma chamber 30 is made from the same 78 microns-thick double-sided adhesive tape as the blood chamber 26. After the test and positive control wells 36, 40 fill with plasma 16, this same technique is used to route excess plasma 16 out of each well 36, 40 and into 0.3 mm wide×0.2 mm deep drain channels that feed into the right compartment or plasma reservoir 62 of the thumb component 25. The underside of the base component 23 may also include features that can be used to install the assembled device 10 into an existing BD POC reader for imaging and test result reporting, if desired.

In one exemplary embodiment, the thumb component 25 may include a vacuum exhaust port 48 designed to mate with a third valve 68 in the same manner as described above with respect to the valves 64, 66. The thumb component 25 may also include two port holes 88 that couple with the valves 64, 66 that are attached to the base and top components 21, 23 of the housing 20. In one exemplary embodiment, the thumb component 25 includes alignment and support ribs that insert into slots in the base and top components 21, 23. After the base and top components 21, 23 are assembled together, an adhesive is applied to each rib. Next, the ribs are inserted into the slots in the base and top components 21, 23, and the assembly is then placed under a UV light source to cure the adhesive and join the components together. The same adhesive may also be applied to the base and top component valves 64, 66 coupled in the thumb component ports as well as around the valve 68 attached to the end of the thumb component 25 to seal each interface and prevent vacuum leaks. In one embodiment, the thumb component may include three (3) individual compartments. Each compartment serves a specific purpose. The left compartment or whole blood reservoir 60 captures the used blood 12, 14 drained from the blood chamber 26. The right compartment or plasma reservoir 62 captures the excess plasma 16 drained from the plasma chamber 30 and a third compartment 77 may be located adjacent to a valve exhaust port that prevents used blood and excess plasma from blocking the port. This feature allows multiple depressions of the actuator 22 without ejecting used blood or excess plasma through the exhaust port. In one embodiment, an absorbent material can be added to the thumb compartments, if needed, to ensure blood or plasma is not ejected from the exhaust port. The height of the partition that separates the thumb reservoir into the three (3) compartments also doubles as an actuator displacement stop.

In one exemplary embodiment, when the actuator 22 is depressed and released it generates the necessary vacuum pressure to draw the blood sample 12 into the device 10 and separate the plasma 16 from whole blood 14 of the blood sample 12. Different actuator displacement distances affect the amount of vacuum pressure generated. For example, the larger the displacement, the higher the vacuum pressure. In order to generate a consistent vacuum pressure each time regardless of the user; the thumb compartment partition rib will be used to stop the actuator displacement at a specific distance. The thumb component 25 may also contain equally spaced vertical ribs around the flange ID that are used to locate and center the actuator 22 over the thumb reservoir compartments. In one embodiment, the actuator 22 may be joined to the thumb component 25 using the same adhesives used to seal the valves. In other embodiments, other grades or brands of adhesive or other methods of joining the components may be used.

In an exemplary embodiment, the blood separation device 10 may be used by first withdrawing a blood sample 12 from a patient. A portion of the blood sample 12, up to 350 µL, is then dispensed or pipetted into the inlet port 24 on the microfluidic plasma separation device 10. Next, a user depresses and releases the actuator 22 on the device 10 to draw the blood sample 12 into the device 10 where plasma separation is automatically performed. As plasma 16 begins to separate from the blood sample 12, it flows simultaneously into two individual wells 36, 40 where it mixes with test well reagents or antibodies, e.g., a first reagent 38 and a second reagent 42. Used blood 12 and excess plasma 16 drain into the respective compartments 60, 62 of the thumb component 25. In some embodiments, if the well 36, 40 contents contain colorimetric reagents, tape over the input port is removed and well vent holes are tested and then a prescribed time per the protocol is carried out to allow the color reaction to occur. The contents of each well 36, 40 in the disposable device 10 can then be analyzed by a POC reader to verify the test is functioning properly and report the test result. In other alternative embodiments, if washing the well contents is required by the protocol, washing solution can be dispensed or pipetted into the device inlet port 24 and then the user repeats vacuum sequence, i.e., depressing and releasing the vacuum actuator 22 again, to pull the solution into the device 10 and wash the well contents. Excess wash solution drains into the thumb reservoir. Repeat washing if required by the protocol. The contents of each well 36,40 in the disposable device 10 can then be detected by a POC reader to verify the test is functioning properly and report the test result. After test completion, the single-use disposable device 10 may then be discarded.

FIGS. 5-8 illustrate another exemplary embodiment of a blood separation device 100 of the present disclosure. Referring to FIGS. 5-8, a blood separation device 100 of the present disclosure is adapted to receive a blood sample 12 having a whole blood portion 14 and a plasma portion 16. The present disclosure provides a blood separation device and a separation process that allows high quality plasma to be generated using a single power source.

The embodiment illustrated in FIGS. 5-8 includes similar components to the embodiment illustrated in FIGS. 1-4, and the similar components are denoted by a reference number followed by the letter A. For the sake of brevity, these similar components and the similar steps of using blood separation device 100 (FIGS. 5-8) will not all be discussed in conjunction with the embodiment illustrated in FIGS. 5-8.

In one exemplary embodiment, the separated plasma may flow through a conjugate pad where the antigen of interest, if present in the plasma sample, pairs with detection antibodies within the conjugate pad. After leaving the conjugate pad, the plasma flows over to one or more pieces of nitrocellulose membrane or other similar types of 3-D structures containing capture antibodies. For samples containing the antigen of interest, the antigen plus detection antibodies pair with the capture antibodies in the membrane and a visible line or mark appears. The line on each membrane can then be detected by a POC reader where the test results are reported. In one embodiment, the detection antibodies are attached directly to the test area in the device or may be embedded in hydrogel located in the test area. This device then functions similarly with the plasma separated from blood flowing through a conjugate pad or other porous material containing the capture antibodies that pair with the antigen of interest. The plasma then flows from the conjugate pad or similar to the test area where the antigen plus capture antibody pair with the detection antibodies which again can be detected by a POC reader and the test results reported.

Referring to FIGS. 5-8, a blood separation device 100 generally includes a housing 120 and an actuator 122. In one embodiment, the housing 120 may include a top component 21A, a bottom component 23A, and a third or thumb component 25A. In one exemplary embodiment, the housing 120 includes an inlet port 124 adapted to receive the blood sample 12, a first or blood chamber 126 having a first chamber flow channel 128 in fluid communication with the inlet port 124, a second or plasma chamber 130 having a second chamber flow channel 132, and a separation member 34A disposed between the first chamber 126 and the second chamber 130. The separation member 34A is adapted to restrain the whole blood portion 14 in the first chamber flow channel 128 and allow the plasma portion 16 to pass therethrough into the second chamber flow channel 132. In one embodiment, the separation member 34A comprises a track-etched membrane.

In one exemplary embodiment, the housing 120 also includes a testing area 135 that is in fluid communication with the second chamber flow channel 132. In one embodiment, the testing area 135 includes a first portion 136 having a first testing substance 138 and a second portion 140 having a second testing substance 142.

In one exemplary embodiment, the testing area 135 includes a plasma separation compartment 190 between the second chamber flow channel 132 and the first portion 136 of the testing area 135. In one embodiment, the testing area 135 includes a lateral flow strip 192. In one embodiment, the first portion 136 comprises a conjugate pad. In one embodiment, the second portion 140 comprises a three-dimensional structure. In one embodiment, the first testing substance 138 comprises a detection antibody and the second testing substance 142 comprises a capture antibody.

In one exemplary embodiment, the actuator 122 is disposed at least partially within the housing 120 and in communication with the inlet port 124, the first chamber 126, and the second chamber 130. The actuator 122 of the blood separation device 100 is transitionable between an original position (FIGS. 13 and 15) and a depressed position (FIG. 14). In one embodiment, after actuation (FIG. 14) of the actuator 122, as the actuator 122 returns to the original position (FIGS. 13 and 15), the actuator 122 applies a vacuum pressure to simultaneously draw the blood sample 12 through the first chamber flow channel 128 and the plasma portion 16 through the separation member 34A into the second chamber flow channel 132. In one embodiment, the actuator 122 is a push button 50A.

Referring to FIGS. 5-8, the blood separation device 100 also includes a viewing window 44A, a whole blood reservoir 60A, a plasma reservoir 62A, a first valve 64A, a second valve 66A, and a third valve 68A, as described in detail above with respect to blood separation device 10 (FIGS. 1-4).

As described in more detail below, in one exemplary embodiment, after actuation (FIG. 14) of the actuator 122, as the actuator 122 returns to the original position (FIGS. 13 and 15), the actuator 122 applies a vacuum pressure to simultaneously draw the blood sample 12 through the first chamber flow channel 128 and the plasma portion 16 through the separation member 34A into the second chamber flow channel 132.

As described in more detail below, in one exemplary embodiment, if the plasma portion 16 contains an antigen, a positive condition is created in the second portion 140. If the plasma portion 16 does not contain the antigen, a negative condition is created in the second portion 140.

As described in more detail below, in one exemplary embodiment, the plasma portion 16 flows from the second chamber flow channel 132 to the first portion 136 of the testing area 135 and if the plasma portion 16 contains the antigen, the antigen pairs with the first testing substance 138, then the plasma portion 16 and the first testing substance 138 flow into the second portion 140 of the testing area 135 and the antigen and the first testing substance 138 bind with the second testing substance 142 to create the positive condition.

In one embodiment, after a second actuation (FIG. 14) of the actuator 122, as the actuator returns to the original position (FIGS. 13 and 15), the actuator 122 applies a second vacuum pressure to draw the plasma portion 16 through the second chamber flow channel 132 to the first portion 136 and the second portion 140 of the testing area 135. In one embodiment, the blood separation device 100 may also include a buffer that is introduced into the plasma portion 16 and the testing area 135 upon the second actuation of the actuator 122.

Referring to FIGS. 5-8, in an exemplary embodiment, the blood separation device 100 of the present disclosure includes a lateral flow strip 192. The device 100 of the present disclosure is very simple and easy to use and is designed to separate plasma 16 from blood 12, flow the separated plasma 16 through a first portion 136, e.g., a conjugate pad, containing detection antibodies which then flows directly into a second portion 140, e.g., a three-dimensional structure, such as a nitrocellulose membrane. As the detection antibodies plus antigen wick down the three-dimensional structure they bind to capture antibodies embedded in the three dimensional structure test area which changes color based on the concentration of antigen present in the sample 12. In the absence or lack of sufficient antigen in the sample 12, the test area color remains unchanged. The blood separation device 100 of the present disclosure is not strictly limited to using nitrocellulose membranes or typical conjugate pad materials. For example, other non-biasing three-dimensional structure, membranes or pads may instead be used.

The vacuum operation for the blood separation device 100 is the same as described in detail above with respect to the blood separation device 10.

An important difference in the use of the blood separation device 100 is what happens next with the separated plasma 16. For example, in one exemplary embodiment, the separated plasma 16 flows into a compartment 190 in the base component 23A located adjacent to the conjugate pad 136. The vacuum system and compartment volume are designed so that the majority of separated plasma 16 remains within this compartment 190 to minimize flow into the conjugate pad 136 and three-dimensional structure 140, e.g., nitrocellulose membrane. Next, a sufficient amount of chase buffer is loaded into the inlet port 124 and then a user depresses and releases the actuator 122 again to activate the vacuum system which flows the separated plasma 16 plus buffer through the conjugate pad 136 and into the three-dimensional structure 140. If the antigen of interest is present in the plasma 16, the detection antibodies in the conjugate pad 136 attach to the antigen as the sample wicks down the three-dimensional structure 140 to the test area 135 where they bind with capture antibodies 142. After waiting the prescribed incubation time per the protocol, a visible line or mark appears in the test area 135 for positive samples which may then be detected visually by the user or imaged by a POC reader that reports the results.

The top component 21A of the blood separation device 100 does not require a thin round clear glass slide and corresponding adhesive disc as well as the vent holes and alignment holes that were discussed with respect to blood separation device 10. In some exemplary embodiments, the addition of a lateral flow strip 192 also dictated increasing the top component 21A length by almost 22 mm. The blood chamber 126 adhesive tape is a semi-transparent and seamless design over the three-dimensional structure test area which permits viewing of the test lines or marks directly through a viewing window 44A. As a result, the glass slide and slide adhesive were removed from the blood separation device 100 as well as the glass slide recess in the top component. Likewise, air is not required to pair the antigen and antibodies on the three-dimensional structure nor vent the vacuum system after plasma separation; therefore, both vent holes were also removed. To accommodate the lateral flow strip 192 while trying to minimize overall device length as well as maintaining the test line in the center of the imaging window, the alignment holes that mate with posts in the base component 23A were removed. Precise top and base component alignment is still achieved by actively using the front and side surfaces of each component 21A, 23A as mating surfaces.

In one exemplary embodiment, the base component 23A of the housing 120 has the two (2) 5 mm diameter wells of device 10 removed and replaced with a 46.7 mm×9.5 mm×1.4 mm deep recess designed to hold the lateral flow strip 192. Ribs were also introduced in the recess at one end near the conjugate pad 136 and at the opposite end adjacent to the wicking pad. The ribs are designed to hold the strip 192 in place and align it within the recess while also creating a gap between the recess sides and three-dimensional structure 140 to prevent a sample from wicking out as it travels down the three-dimensional structure 140. In an exemplary embodiment, a second recess (e.g., 6.75 mm×7.14 mm×0.84 mm deep) was also added between the lateral flow strip recess and the "U" shaped ribs. This recess is designed to work congruently with the activated vacuum pressure to contain or store up to 40 µL, of separated plasma while at the same time preventing most of the plasma from prematurely flowing into the conjugate pad 136 and the three-dimensional structure 140. During plasma separation, plasma 16 flows from the "U" shaped ribs to this plasma separation compartment 190 through a (e.g., 0.5 mm wide×0.7 mm deep) channel. After a chase buffer is added and the vacuum system is activated again, the separated plasma 16 and chase buffer flow from the plasma compartment 190 to the conjugate pad 136 in the lateral flow strip 192 through a (e.g., 1.0 mm×0.5 mm×0.84 mm deep) channel. A (e.g., 0.2 mm wide×0.3 mm deep) drain channel at the opposite end of the lateral flow strip recess routes any excess plasma or chase buffer that traveled through the strip to the valve 68A which drains into the right compartment 62A of the thumb component 25A.

In one exemplary embodiment, the addition of the lateral flow strip 192 also dictated increasing the base component 23A length by almost 22 mm which is the same increase as the top component 21A. To accommodate the lateral flow strip 192 while trying to minimize overall cartridge length as well as maintaining the test line in the center of the top component imaging window, the alignment posts that mate with holes in the top component 21A were removed. Precise top and base component alignment is still actively achieved by using the front and side surfaces of each component 21A, 23A as mating surfaces. The underside of the base component 23A also contains the same features as the device 10 that can be used to install the assembled device into an existing BD POC instrument for imaging if desired.

In an exemplary embodiment, the blood separation device 100 may be used by first withdrawing a blood sample 12 from a patient. A portion of the blood sample 12, up to 350 µL but typically 200 µL, is then dispensed or pipetted into the inlet port 124 on the microfluidic plasma separation device 100. Next, a user depresses and releases the actuator 122 on the device 100 to draw the blood sample 12 into the device 100 where plasma separation is automatically performed. Used blood that passes over the separation member 34A drains into the thumb component 25A. As plasma 16 begins to separate from the blood sample 12, it flows into and is mostly contained within the plasma separation compartment 190. A small volume of separated plasma 16 may flow through the compartment 190 and into the conjugate pad 136 is typical and expected. Next, chase buffer is added to the inlet port 124 and the user repeats the vacuum sequence, i.e., depressing and releasing the actuator 122 again, to flow plasma and buffer through the conjugate pad 136 containing detection antibodies 138 and into the three-dimensional structure 140. Excess plasma/chase buffer, if any, drain into the thumb component 25A. As the detection antibodies 138 plus antigen present in the sample wick down the three-dimensional structure 140 they bind to capture antibodies 142 embedded in the three dimensional structure test area, which changes color based on the concentration of antigen present in the sample. In the absence or lack of sufficient antigen in the sample, the test area color remains unchanged. For a proper functioning test, a positive control mark will be visible, and for a positive test, a test mark will also be visible. The positive control and test marks on the lateral flow strip 192 can then be inserted and detected by a POC reader to verify the test is functioning properly and report the test result. The single-use disposable device 100 may then be discarded after test completion.

FIGS. 9-12 illustrate an exemplary embodiment of a blood separation device 200 of the present disclosure. Referring to FIGS. 9-12, a blood separation device 200 of the present disclosure is adapted to receive a blood sample 12 having a whole blood portion 14 and a plasma portion 16. The present disclosure provides a blood separation device and a separation process that allows high quality plasma to be generated using a single power source.

FIGS. 9-12 illustrate another exemplary embodiment of a blood separation device of the present disclosure. The embodiment illustrated in FIGS. 9-12 includes similar components to the embodiment illustrated in FIGS. 1-4 and the embodiment illustrated in FIGS. 5-8, and the similar components are denoted by a reference number followed by the letter B. For the sake of brevity, these similar components and the similar steps of using blood separation device 200 (FIGS. 9-12) will not all be discussed in conjunction with the embodiment illustrated in FIGS. 9-12.

In one exemplary embodiment, a plasma separation cartridge was designed to replace an entire lateral flow strip with individual positive control and test marks on separate three-dimensional structure. It has been observed that nitrocellulose membranes as well as other types of membranes can introduce analyte bias that can skew a final test result. Therefore, the three-dimensional structure used in this device were significantly reduced to minimize those biasing effects. The plasma separation cartridge with membrane strips is designed to separate plasma from blood and flow the separated plasma through a conjugate pad containing detection antibodies to two different wells containing three-dimensional structure, e.g., small strips of nitrocellulose membrane, embedded with capture antibodies which change color based on the concentration of antigen present in the sample. This device is not strictly limited to using nitrocellulose membranes or typical conjugate pad materials. Other non-biasing three-dimensional structure, membranes or pads may instead be used.

Referring to FIGS. 9-12, a blood separation device 200 generally includes a housing 220 and an actuator 222. In one embodiment, the housing 220 may include a top component 21B, a bottom component 23B, and a third or thumb component 25B. In one exemplary embodiment, the housing 220 includes an inlet port 224 adapted to receive the blood sample 12, a first or blood chamber 226 having a first chamber flow channel 228 in fluid communication with the inlet port 224, a second or plasma chamber 230 having a second chamber flow channel 232, and a separation member 34B disposed between the first chamber 226 and the second chamber 230. The separation member 34B is adapted to restrain the whole blood portion 14 in the first chamber flow channel 228 and allow the plasma portion 16 to pass therethrough into the second chamber flow channel 232. In one embodiment, the separation member 34B comprises a track-etched membrane.

In one exemplary embodiment, the housing 220 also includes a testing area 135B that is in fluid communication with the second chamber flow channel 232. In one embodiment, the testing area 135B includes a first portion 136B having a first testing substance 138B and a second portion 140B having a second testing substance 142B.

In one exemplary embodiment, the testing area 135B includes membrane strips 280. In one embodiment, the second portion 140B includes a first recess 282 containing a first membrane strip 284. In one embodiment, the second portion 140B includes a second recess 286 containing a second membrane strip 288. In one embodiment, the first portion 136B comprises a conjugate pad. In one embodiment, the first testing substance 138B comprises a detection antibody and the second testing substance 142B comprises a capture antibody.

In one exemplary embodiment, the actuator 222 is disposed at least partially within the housing 220 and in communication with the inlet port 224, the first chamber 226, and the second chamber 230. The actuator 222 of the blood separation device 200 is transitionable between an original position (FIGS. 13 and 15) and a depressed position (FIG. 14). In one embodiment, after actuation (FIG. 14) of the actuator 222, as the actuator 222 returns to the original position (FIGS. 13 and 15), the actuator 222 applies a vacuum pressure to simultaneously draw the blood sample 12 through the first chamber flow channel 228 and the plasma portion 16 through the separation member 34A into the second chamber flow channel 232. In one embodiment, the actuator 222 is a push button 50B.

The vacuum operation for the blood separation device 200 is the same as described in detail above with respect to the blood separation device 10.

An important difference in the use of the blood separation device 200 is what happens next with the separated plasma 16. For example, in one exemplary embodiment, the separated plasma 16 flows through a channel in the base component 23B to a conjugate pad 136B containing detection antibodies 138B. Again, this device 200 is not strictly limited to using typical conjugate pad materials and other non-biasing materials may instead be used. If the antigen of interest is present in the plasma 16, the antigen binds to the detection antibodies 138B and then the plasma 16 flows out of the conjugate pad 136B and into two recesses 282, 286 containing small membrane strips 284, 288 of nitrocellulose membrane embedded with capture antibodies 142B. Again, this device is not strictly limited to using nitrocellulose membranes and other non-biasing three-dimensional structure may instead be used. For samples containing the antigen of interest, the antigen plus detection antibodies 138B attach to capture antibodies 142B in the test area of the three-dimensional structure 140B. Excess plasma 16 that travels through the three-dimensional structure 140B is drained through the same valve 68B and into the right compartment 62B of the thumb component 25B as discussed above with respect to device 10. After the prescribed incubation time per the protocol, chase buffer is flushed through the device 200 using the actuator 222 to remove unattached antibodies in the three-dimensional structure. If the antigen of interest is present in the sample, a visible line or mark appears in the test area on the three-dimensional structure for positive samples which may then be detected visually by the user or imaged by a POC reader that reports the results.

In an exemplary embodiment, the blood separation device 200 may be used by first withdrawing a blood sample 12 from a patient. A portion of the blood sample 12, up to 350 µL, is then dispensed or pipetted into the inlet port 224 on the microfluidic plasma separation device 200. Next, a user depresses and releases the actuator 222 on the device 200 to draw the blood sample 12 into the device 200 where plasma separation is automatically performed. As plasma 16 begins to separate from the blood sample 12, it flows into the conjugate pad 136B where detection antibodies 138B pair with the antigen of interest. After passing through the conjugate pad 136B, the plasma 16 then streams over to the individual test and positive control strips 280, 284, 288 embedded with capture antibodies 142B. If the antigen of interest is present, the antigen plus detection antibodies 138B attach to the capture antibodies 142B. Used blood 12 and excess plasma 16 drain into the thumb component 25B. If rinsing of the test strips 280, 284, 288 is required by the protocol, rinsing solution or chase buffer is then dispensed or pipetted into the inlet port 224. The user then repeats a vacuum sequence, i.e., depressing and releasing the actuator 222 again, to pull the sample 12 into the device 200 and rinse or flush the test strips 280, 284, 288. Excess solution drains into the thumb component 25B. Repeat as needed by the protocol. For a proper functioning test, the positive control mark will be visible, and for a positive test, a test mark will also be visible. The marks on the positive control and test strips 280, 284, 288 in the device 200, if visible, can then be detected by a POC reader to verify the test is functioning properly and report the test result. The single-use disposable device 200 may then be discarded after test completion.

Figure 18A:
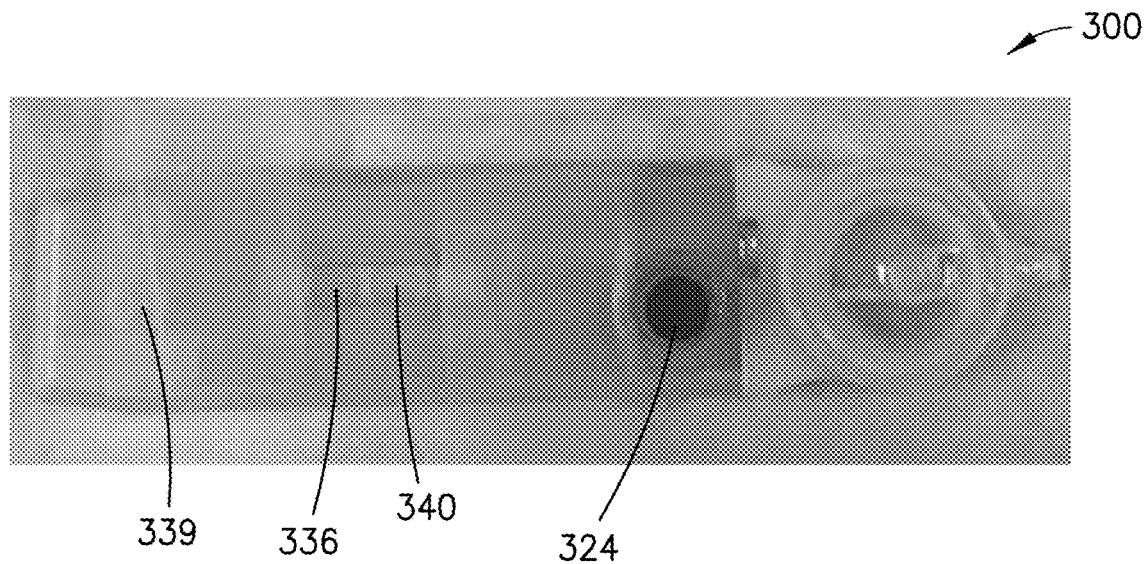
FIGS. 18A-18C illustrate an exemplary triglyceride assay using a blood separation device in accordance with an embodiment of the present invention.
Figure 18B:
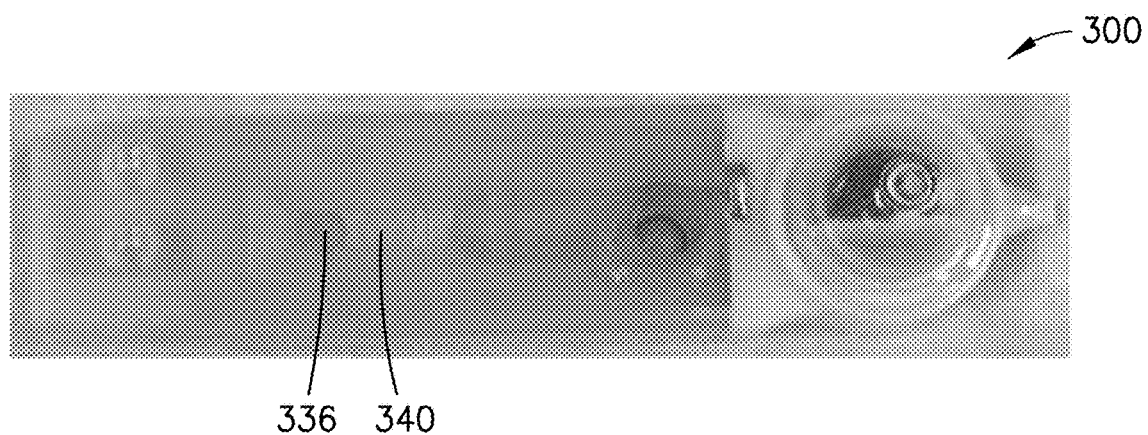
Figure 18C:
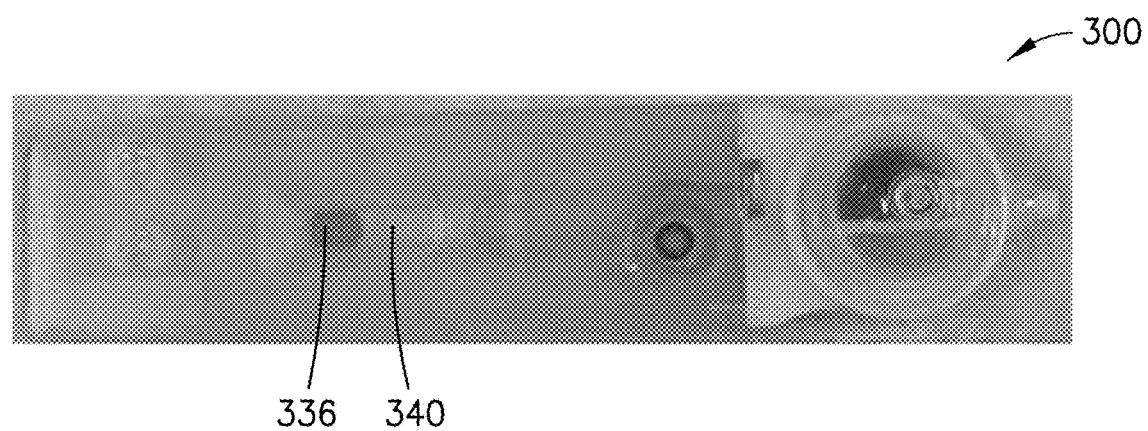

FIGS. 18A-18C illustrate an exemplary triglyceride assay using a blood separation device in accordance with an embodiment of the present invention. FIG. 18A shows the blood separation device 300 with input port 324 filled with blood sample prior to plasma separation. The test well 336 contains dried down triglyceride colorimetric reagent, while the positive control well 340 does not contain this reagent. FIG. 18A shows an adhesive tape 339 over vent holes for the reasons discussed above.

FIG. 18B shows the blood separation device of FIG. 18A just after plasma separation, that is, at time 0 (zero) minutes. The plasma filled the test well 336 and the positive control well 340. The adhesive tape was removed as discussed above.

Figure 19:
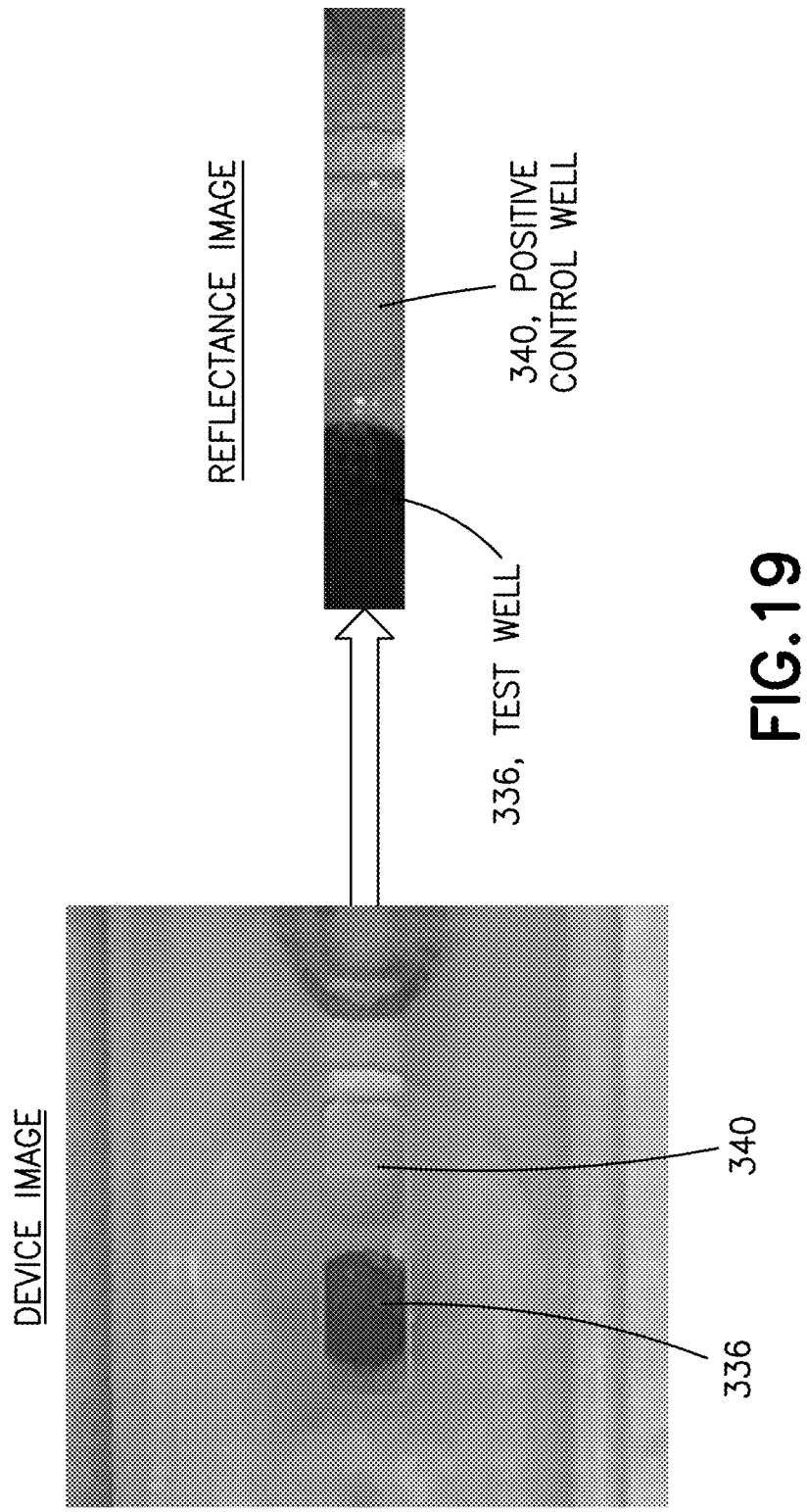
FIG. 19 illustrates images of the test well and the positive control well of the embodiment of FIG. 18C using a POC reader.

FIG. 18C shows the same blood separation device as in FIGS. 18A and 18B, at time 15 minutes. In the test well 336, the triglyceride in the plasma sample mixed with the dried down reagent caused the test well color to change and fully developed (left well). On the other hand, the color of the positive control well (340) containing no reagents remained unchanged. FIG. 19 illustrates images of the test well 336 and the positive control well 340 of the embodiment of FIG. 18C using a reflectance based POC reader.

Figure 20A:
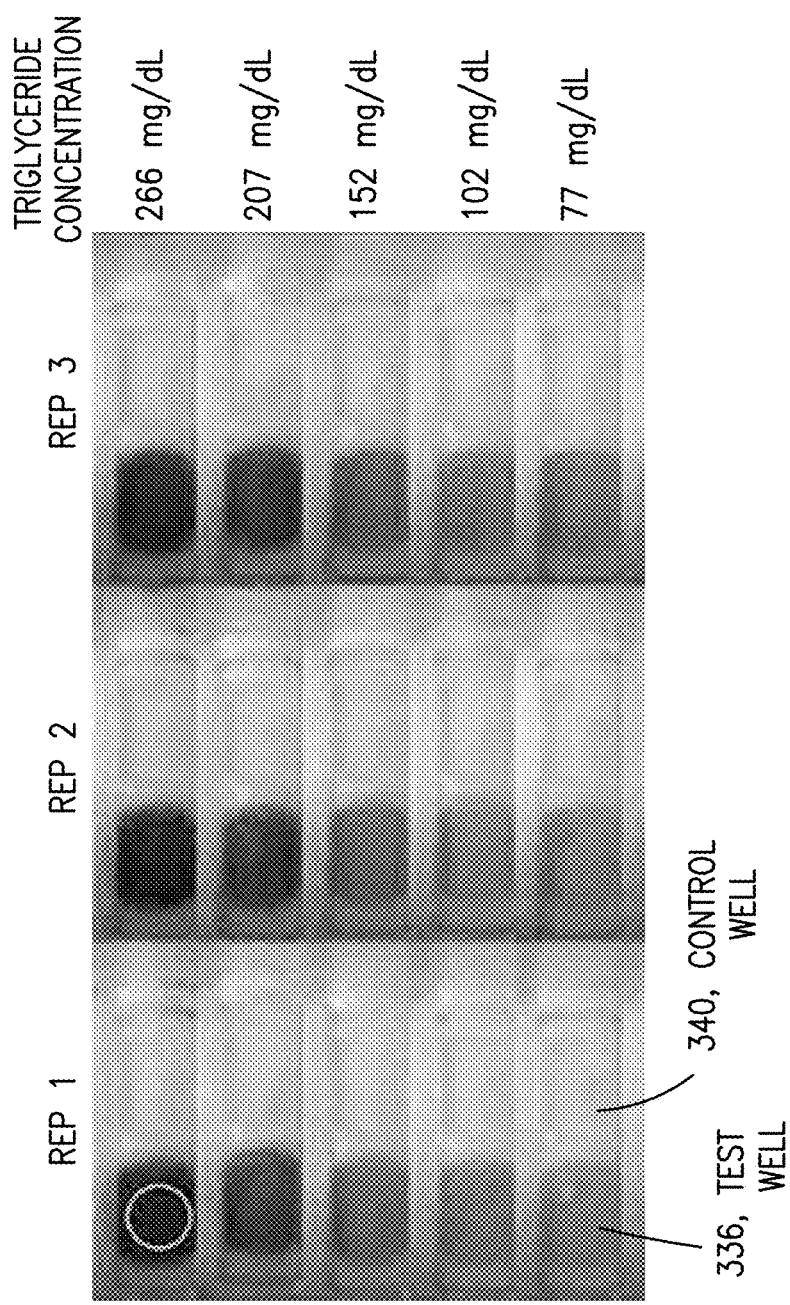
FIGS. 20A and 20B show images and plot, respectively, of an exemplary triglyceride colorimetric assay using a blood separation device in accordance with an embodiment of the present invention.
Figure 20B:
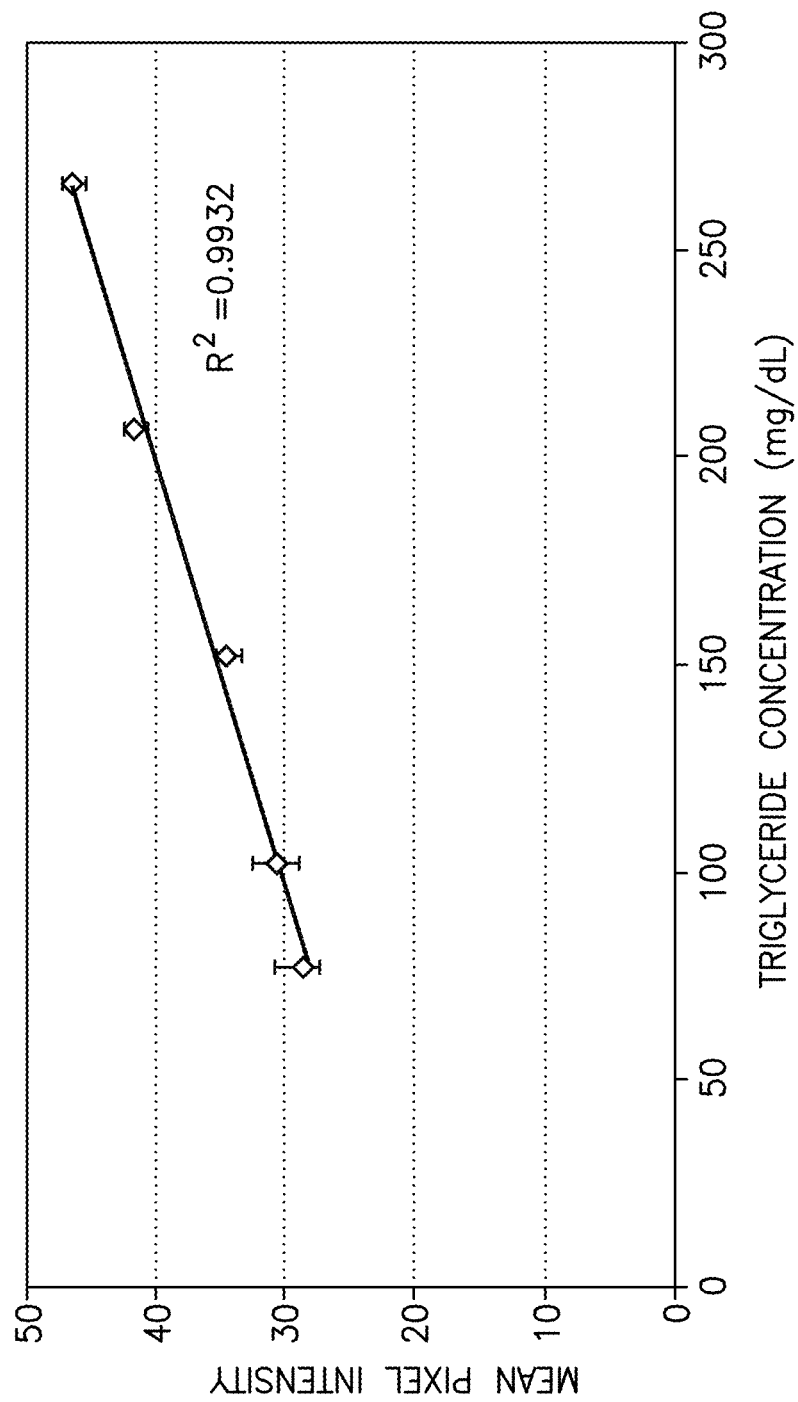

FIGS. 20A and 20B show images and plot, respectively, of an exemplary triglyceride colorimetric assay using a blood separation device in accordance with an embodiment of the present invention. In the embodiment of the present invention, blood samples with a series of known concentration of triglyceride were collected in the integrated TEM-Veritor™ cartridge, where they were reacted with reagents for enzymatic hydrolysis and glycerol quantification. Three assays were run at each concentration The pixel intensity read from the Veritor™ reader was plotted against the concentration. The chart in FIG. 20B shows the integrated TEM-Veritor™ platform of the present invention is capable of detecting triglyceride in colorimetry detection mode with good linearity.

FIG. 21 compares the measured triglycerides concentration using AMS clinical chemistry analyzer (i.e., the Reference concentration) and a blood separation device in accordance with an embodiment of the present invention (i.e. the interpolated concentration). An integrated TEM-Veritor™ cartridge of the present invention was used to separate plasma and determine the triglyceride in three random blood samples on a Veritor™ reader. This comparative data shows the feasibility of the blood separation device of the present invention for applications based on colorimetric assays in terms of both percent difference from the reference values and the coefficient of variation from the reference values.

Figure 22A:
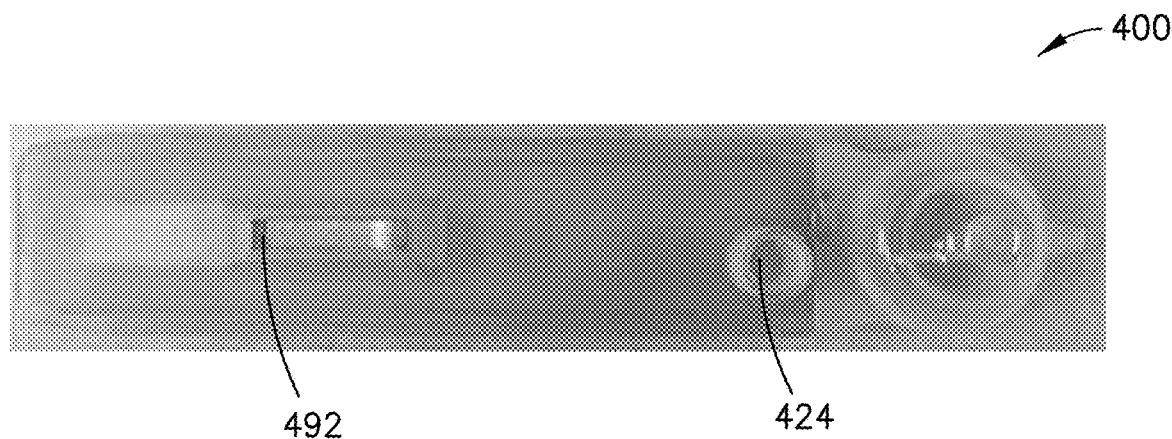
FIGS. 22A-22C illustrate an exemplary thyroid stimulating hormone (TSH) assay using a blood separation device in accordance with an embodiment of the present invention.
Figure 22B:
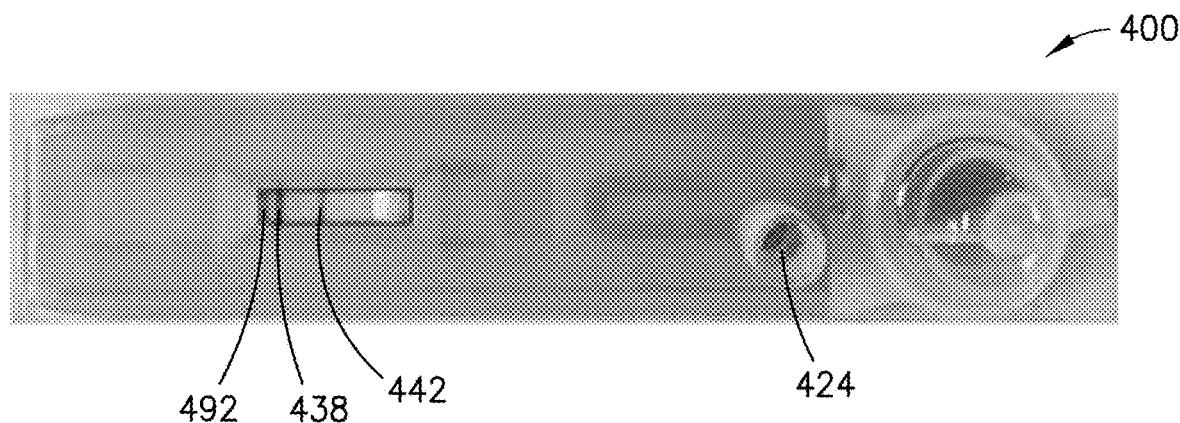
Figure 22C:
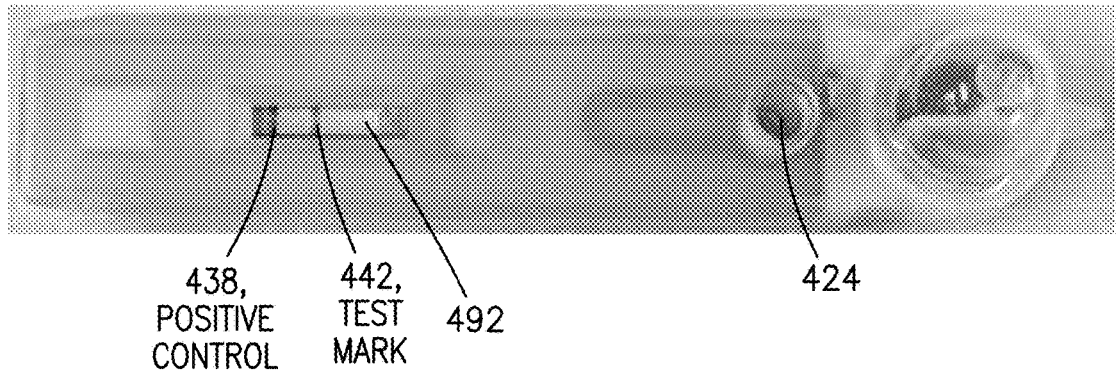

FIGS. 22A-22C illustrate an exemplary TSH assay using a blood separation device 400 in accordance with an embodiment of the present invention. FIG. 22A shows the blood separation device 400 with a commercially available TSH lateral flow assay strip 492 prior to blood sample collection through port 424.

FIG. 22B shows the blood separation device of FIG. 22A with 1504, whole blood sample spiked with a high concentration of TSH antigen at time 15 minutes after plasma separation. Visible positive control mark 438 indicates the test functioned properly. Visible test mark 442 indicates a positive test result for high TSH.

FIG. 22C shows the same blood separation device as in FIG. 22A with 200 μL whole blood sample (introduced into device port 424) spiked with a high concentration of TSH antigen at time 15 minutes after plasma separation. Visible positive control mark 438 indicates the test functioned properly. Visible test mark 442 indicates a positive test result for high TSH.

Figure 23A:
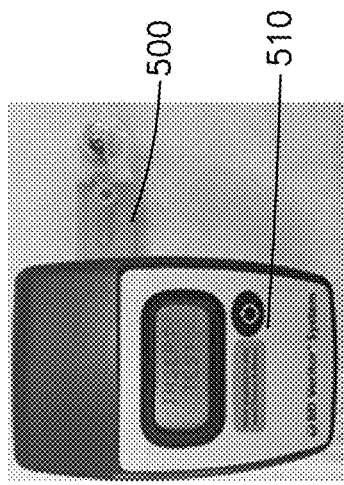
FIGS. 23A-23C illustrate aspects of a TSH assay.
Figure 23B:
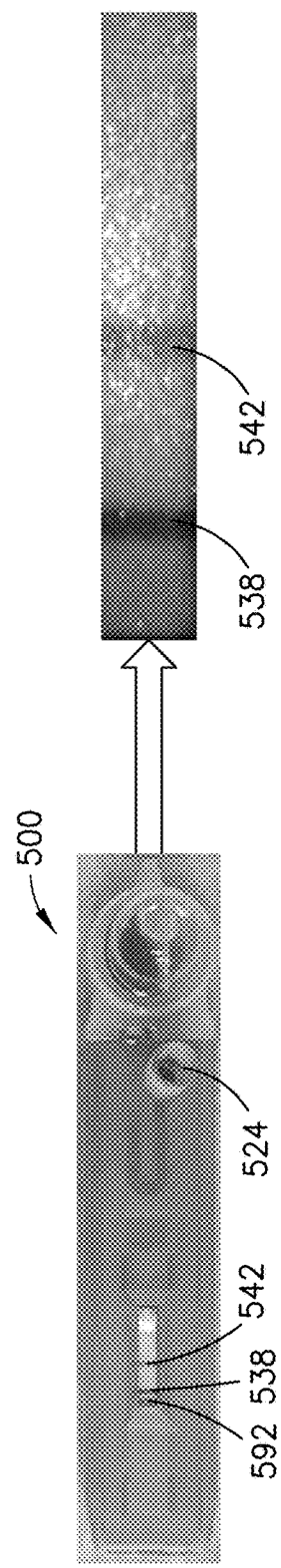
Figure 23C:
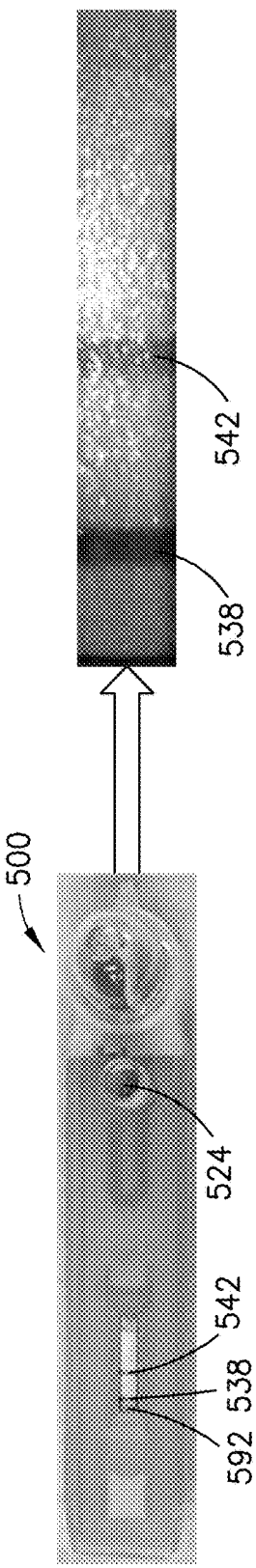

FIG. 23A shows an exemplary TSH assay device 510 using a blood separation device 500 in accordance with an embodiment of the present invention. FIGS. 23B and 23C show images of exemplary TSH assays using the blood separation device of FIG. 23A. FIG. 23B shows both the image of the device 500 with both the positive control line 538 and the positive test result line 542 visible on the test strip 592 and the reflectance image of the test strip 592 showing both the positive control line 538 and the positive test result line 542. FIG. 23C shows both the image of the device 500 with both the positive control line 538 and the positive test result line 542 visible on the test strip 592 and the reflectance image of the test strip 592 showing both the positive control line 538 and the positive test result line 542.

Figure 24A:
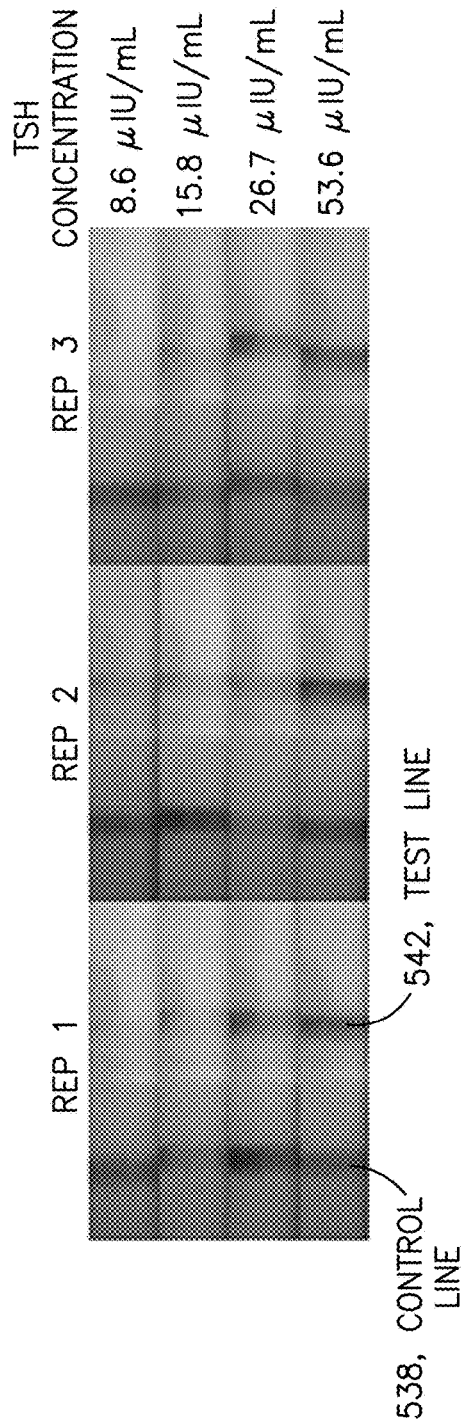
FIGS. 24A and 24B show images and plot, respectively, of an exemplary TSH assay using a blood separation device in accordance with an embodiment of the present invention.
Figure 24B:
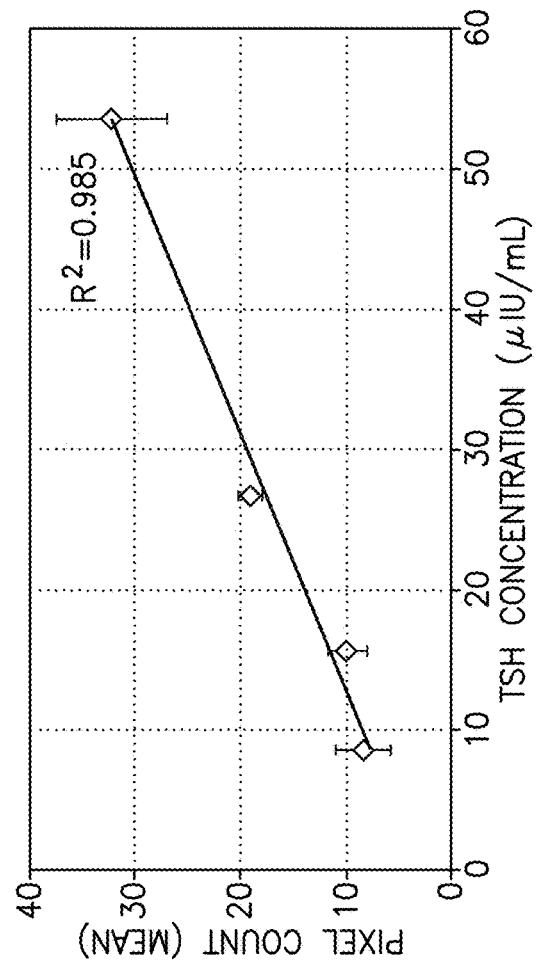

FIGS. 24A and 24B show images and plot, respectively, of an exemplary TSH assay using a blood separation device in accordance with an embodiment of the present invention. The integrated TEM-Veritor™ cartridge in accordance with an embodiment of the present invention was used to separate plasma from blood samples with known concentrations of TSH. Three assays were run at each concentration and the images of the positive control lines 538 and the positive test result lines are as illustrated in FIG. 24A. The TSH concentrations were read from the Veritor™ reader. The pixel intensity from the reflectance images of FIG. 24A were plotted against the concentration. The chart in FIG. 24B shows that the blood separation device of the present invention is capable of detecting TSH in colorimetry detection mode with good linearity.

FIG. 25 shows a comparison of the measured TSH concentration using a Thyrocheck® cartridge and a blood separation device in accordance with an embodiment of the present invention. The integrated TEM-Veritor™ cartridge in accordance with an embodiment of the present invention was used to separate plasma from blood samples with known concentrations of TSH. The TSH concentration was detected using lateral flow assay on the Veritor™ and compared with that measured using a Thyrocheck® cartridge. Test results from three sets of assays such as those described in FIG. 24A were obtained. The linearity of the comparative data in the table in FIG. 25 shows the feasibility of the blood separation device of the present invention for applications based on colorimetric assays.

Figure 26A:
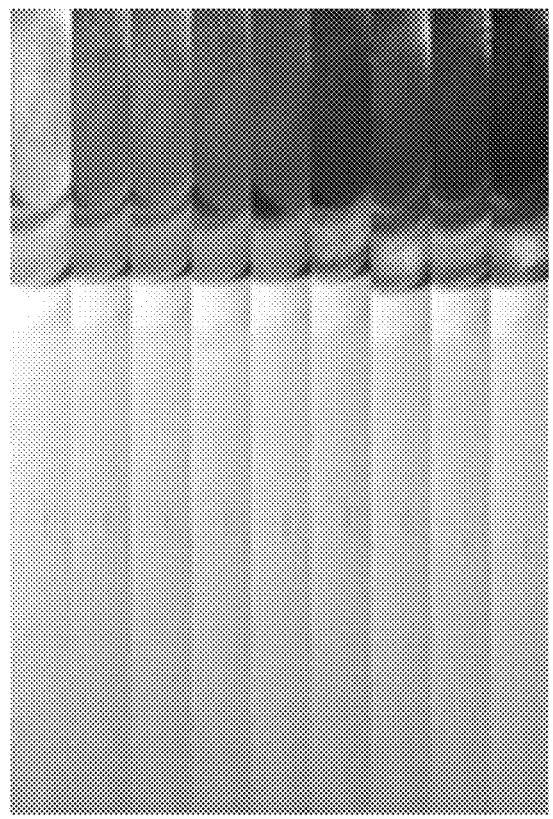
FIGS. 26A and 26B show images and plot, respectively, of an exemplary protein assay using a blood separation device in accordance with an embodiment of the present invention.
Figure 26B:
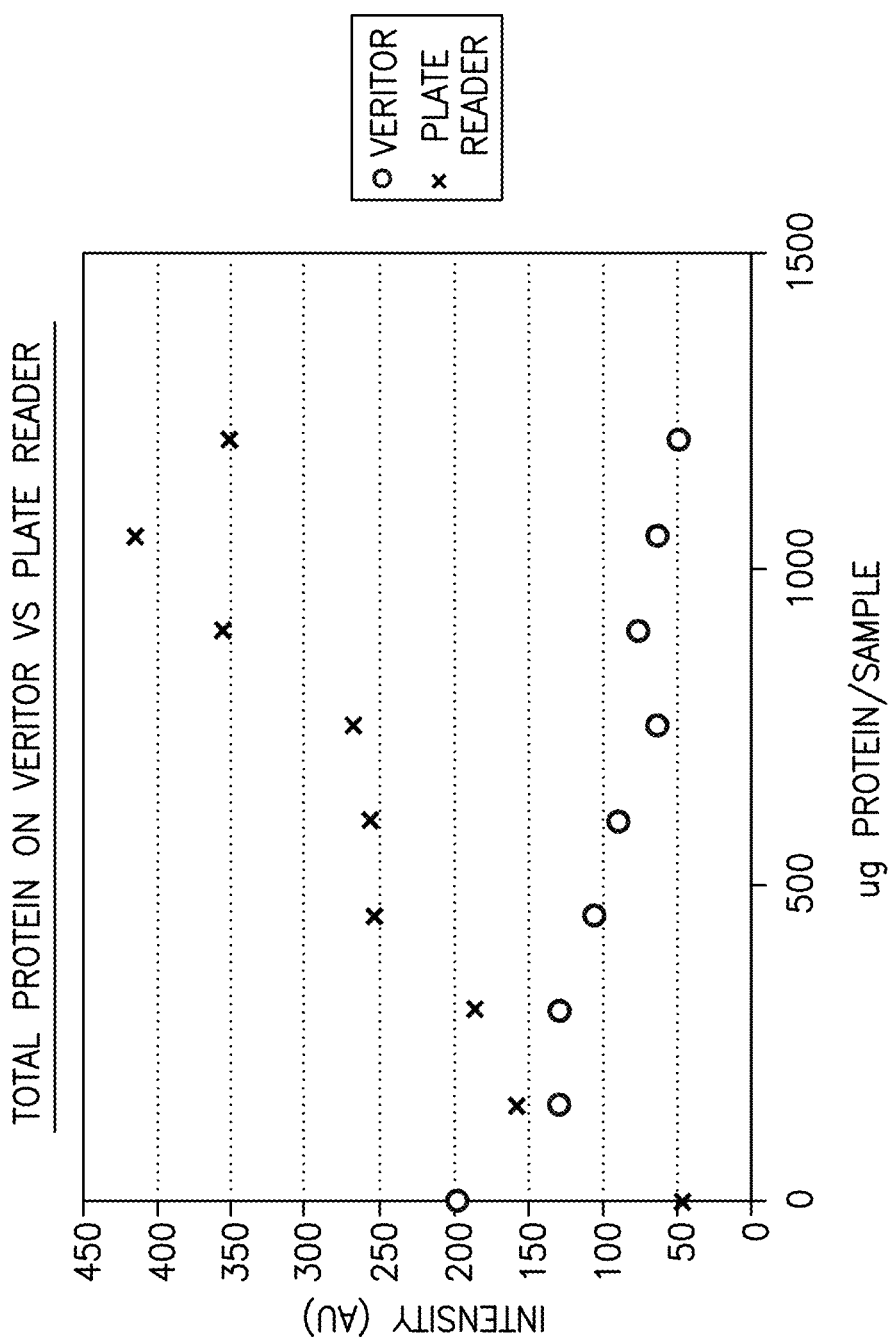

FIGS. 26A and 26B show images and plot, respectively, of an exemplary protein assay using a blood separation device in accordance with an embodiment of the present invention. Detection of total protein in plasma is often performed in a chemistry panel for blood samples. Detection of total protein concentration based on colorimetric assay was studied using an embodiment of the present invention. Samples of different protein concentrations were prepared and mixed with assay reagents and tested simultaneously on an integrated TEM-Veritor™ of the present invention using the reflectance mode of one of the RGB LEDs (e.g., the green light LED) and a commercial plate reader to measure absorbance on a test region of the device. The intensity values were plotted as a function of the total protein concentration, where the output for Veritor™ was the pixel intensity. FIG. 26B shows that the standard plate reader reading (absorption) increases as protein concentration increases, while the Veritor™ reading (reflectance pixel) decreases as protein concentration increases. However, the readings from the two different readers change linearly as the protein concentration changes. Hence, the comparative results of FIG. 26B show that the integrated TEM-Veritor™ of the present invention is a viable detection method for total protein in a broad concentration range.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A blood separation device adapted to receive a blood sample having a whole blood portion and a plasma portion, the blood separation device comprising:
   a housing including an inlet port adapted to receive the blood sample, a first chamber having a first chamber flow channel in fluid communication with the inlet port, a second chamber having a second chamber flow channel, a separation member disposed between the first chamber and the second chamber, a first well in fluid communication with the second chamber flow channel, a second well in fluid communication with the second chamber flow channel, a first vent adjacent to the inlet port, and a second vent adjacent to the first well and the second well; and
   an actuator disposed at least partially within the housing and in communication with the inlet port, the first chamber, and the second chamber, the actuator being transitionable between an original position and a depressed position,
   wherein after actuation of the actuator, as the actuator returns to the original position, the actuator applies a vacuum pressure to simultaneously draw the blood sample through the first chamber flow channel and the plasma portion through the separation member into the second chamber flow channel.

2. The blood separation device of claim 1, wherein the first well includes a first reagent.

3. The blood separation device of claim 1, wherein the second well includes a second reagent.

4. The blood separation device of claim 1, wherein the plasma portion simultaneously flows into the first well and the second well.

5. The blood separation device of claim 4, further comprising a whole blood reservoir in communication with the first chamber flow channel, wherein after the blood sample flows over the separation member, the whole blood portion flows into the whole blood reservoir.

6. The blood separation device of claim 5, further comprising a plasma reservoir in communication with the first well and the second well, wherein after the plasma portion fills the first well and the second well, excess plasma flows into the plasma reservoir.

7. The blood separation device of claim 4, wherein the housing includes a viewing window aligned with the first well and the second well, wherein the viewing window provides visualization of the first well and the second well from outside the housing.

8. The blood separation device of claim 1, further comprising:

a first valve located inside the housing, the first valve being transitionable between a first valve open position and a first valve closed position;

a second valve located inside the housing, the second valve being transitionable between a second valve open position and a second valve closed position; and a third valve located at an external wall of the housing, the third valve being transitionable between a third valve open position and a third valve closed position.

9. The blood separation device of claim 8, wherein, with actuation of the actuator to the depressed position, the first valve is in the first valve closed position, the second valve is in the second valve closed position, and the third valve is in the third valve open position, and wherein, with the actuator transitioning from the depressed position to the original position, the first valve is in the first valve open position, the second valve is in the second valve open position, and the third valve is in the third valve closed position.

10. The blood separation device of claim 1, wherein the separation member is adapted to restrain the whole blood portion in the first chamber flow channel and allow the plasma portion to pass therethrough into the second chamber flow channel.

11. The blood separation device of claim 1, wherein the separation member comprises a track-etched membrane.

12. The blood separation device of claim 1, wherein the actuator is a push button.

\* \* \* \* \*